US012572103B2

(12) United States Patent
Lin et al.

(10) Patent No.: US 12,572,103 B2
(45) Date of Patent: Mar. 10, 2026

(54) INFORMATION PROCESSING APPARATUS, ADAPTATION ASSEMBLY, PROCESS CARTRIDGE AND PROCESS CARTRIDGE SET

(71) Applicant: Zhuhai Pantum Electronics Co., Ltd., Zhuhai (CN)

(72) Inventors: Ruiqi Lin, Zhuhai (CN); Zhe Shao, Zhuhai (CN)

(73) Assignee: Zhuhai Pantum Electronics Co., Ltd., Zhuhai (CN)

( * ) Notice: Subject to any disclaimer, the term of this patent is extended or adjusted under 35 U.S.C. 154(b) by 0 days.

(21) Appl. No.: 18/938,188

(22) Filed: Nov. 5, 2024

(65) Prior Publication Data

US 2025/0147458 A1 May 8, 2025

(30) Foreign Application Priority Data

Nov. 6, 2023 (CN) ......................... 202311469437.5
Dec. 29, 2023 (CN) ......................... 202311874358.2
Mar. 15, 2024 (CN) ......................... 202410304788.9

(51) Int. Cl.
*G03G 15/00* (2006.01)
*G03G 21/16* (2006.01)
*G03G 21/18* (2006.01)

(52) U.S. Cl.
CPC ............. *G03G 15/55* (2013.01); *G03G 15/80* (2013.01); *G03G 21/1652* (2013.01); *G03G 21/1814* (2013.01); *G03G 21/1878* (2013.01)

(58) Field of Classification Search
CPC .... G03G 15/55; G03G 15/80; G03G 21/1652; G03G 21/1814; G03G 21/1878
USPC .................................... 399/12, 107, 110, 111
See application file for complete search history.

(56) References Cited

U.S. PATENT DOCUMENTS 7,603,065 B2 * 10/2009 Yamaguchi ........ G03G 15/0856 399/258
8,430,466 B2 4/2013 Tabata et al.
2003/0030685 A1 2/2003 Nozawa
2003/0142159 A1 7/2003 Askeland et al.

FOREIGN PATENT DOCUMENTS

TW 590896 B 6/2004

OTHER PUBLICATIONS

The European Patent Office (EPO) The Extended European Search Report for Application No. 24210445.3, Apr. 10, 2025 7 Pages.

* cited by examiner

*Primary Examiner* — Hoan H Tran

(74) *Attorney, Agent, or Firm* — Anova Law Group, PLLC

(57) ABSTRACT

The present disclosure provides a process cartridge, an information processing apparatus, and an adaptation assembly. A process cartridge, detachably installed on an image-forming apparatus, includes a main body; a working element, disposed on the main body and configured to detect or obtain a first parameter related to the process cartridge, where the image-forming apparatus is capable of obtaining the first parameter; and further includes an information processing apparatus, disposed on the main body and configured to transmit a correction coefficient to the image-forming apparatus, where the correction coefficient is used to correct the first parameter to obtain the second parameter.

20 Claims, 8 Drawing Sheets

INFORMATION PROCESSING APPARATUS, ADAPTATION ASSEMBLY, PROCESS CARTRIDGE AND PROCESS CARTRIDGE SET

CROSS-REFERENCE TO RELATED APPLICATION

The present disclosure claims the priority to Chinese patent application No. 202311469437.5, filed on Nov. 6, 2023, No. 202311874358.2, filed on Dec. 29, 2023, and No. 202410304788.9, filed on Mar. 15, 2024, the entirety of all of which is incorporated herein by reference.

TECHNICAL FIELD

The present disclosure generally relates to the field of image-forming technology and, more particularly, relates to an information processing apparatus, an adaptation assembly, and a process cartridge.

BACKGROUND

Currently, the main principle of laser printing is that a photosensitive drum absorbs a developer, and then the photosensitive drum transfers the developer to a printing medium and fixes the developer to the printing medium through fixing. A common scenario of a printing device is that a process cartridge is loaded into an image-forming apparatus, and the process cartridge may output the developer. The image-forming apparatus may need to collect or output electrical signals during an image-forming process, configured to implement information exchange between the process cartridge and the main body of the image-forming apparatus. However, in an obtaining or transmission process, the electrical signals may be inaccurate or unreliable due to signal interference, poor contact, low accuracy and the like, which may affect information exchange and determination of the image-forming apparatus.

SUMMARY

One aspect of the present disclosure provides a process cartridge. The process cartridge, detachably installed on an image-forming apparatus, includes a main body; a working element, disposed on the main body and configured to detect or obtain a first parameter related to the process cartridge, where the image-forming apparatus is capable of obtaining the first parameter; and an information processing apparatus, disposed on the main body and configured to transmit a correction coefficient to the image-forming apparatus, where the correction coefficient is used to correct the first parameter to obtain the second parameter.

Another aspect of the present disclosure provides an information processing apparatus, configured at a main body of a process cartridge, where the process cartridge is detachably installed on an image-forming apparatus. The information processing apparatus includes a communication module, configured to communicate with the image-forming apparatus; and a processing module, configured to output a correction coefficient to the image-forming apparatus through the communication module when a preset event occurs, where the correction coefficient is used to correct a first parameter obtained by the image-forming apparatus to obtain a second parameter.

Another aspect of the present disclosure provides a process cartridge, detachably installed on an image-forming apparatus. The process cartridge includes a main body, where the main body is configured with a first installation position, and the first installation position is used to install a working element; and the information processing apparatus mentioned above, where the information processing apparatus is disposed on the main body and configured to transmit the correction coefficient to the image-forming apparatus. When the working element is installed at the first installation position, the working element is configured to detect or obtain the first parameter related to the process cartridge, where the image-forming apparatus is capable of obtaining the first parameter; and the correction coefficient is used to correct the first parameter to obtain the second parameter.

Another aspect of the present disclosure provides a process cartridge set, detachably installed on an image-forming apparatus. The process cartridge set includes a working element and the process cartridge mentioned above, where the working element is installed at the first installation position.

Another aspect of the present disclosure provides a process cartridge, detachably installed on an image-forming apparatus. The process cartridge includes a main body, where the main body is configured with a second installation position, and the second installation position is used to install an information processing apparatus; and a working element, disposed on the main body and configured to detect or obtain a first parameter related to the process cartridge, where the image-forming apparatus is capable of obtaining the first parameter. When the information processing apparatus is installed at the second installation position, the information processing apparatus is configured to transmit a correction coefficient to the image-forming apparatus; and the correction coefficient is used to correct the first parameter measured by the working element to obtain a second parameter.

Another aspect of the present disclosure provides a process cartridge set. The process cartridge set includes the process cartridge mentioned above; and the information processing apparatus mentioned above. The information processing apparatus is installed at the second installation position and electrically connected to the working element; the information processing apparatus is configured to transmit the correction coefficient to the image-forming apparatus; and the correction coefficient is used to correct the first parameter to obtain the second parameter.

Another aspect of the present disclosure provides an adaptation assembly, configured at a process cartridge. The adaptation assembly includes a working element, disposed on a main body of the process cartridge and configured to detect or obtain a first parameter related to the process cartridge, where the image-forming apparatus is capable of obtaining the first parameter; and the information processing apparatus mentioned above.

Other aspects of the present disclosure should be understood by those skilled in the art in light of the description, the claims, and the drawings of the present disclosure.

Compared with existing technology, the process cartridge provided in the present disclosure may include the main body, the working element and the information processing apparatus. The working element and the information processing apparatus may be respectively configured on the main body. The working element may be configured to detect or obtain the first parameter related to the process cartridge; and the image-forming apparatus may be capable of obtaining the first parameter. The information processing apparatus may be configured to transmit the correction coefficient to the image-forming apparatus, such that the image-forming apparatus may correct the first parameter measured by the working element based on the correction coefficient to obtain the second parameter. The present disclosure may correct the first parameter affected by signal interference, poor contact, low precision and the like by correcting the first parameter, thereby improving the accuracy of signal obtaining or transmission.

BRIEF DESCRIPTION OF THE DRAWINGS

To clearly describe technical solutions of various embodiments of the present disclosure, the drawings which need to be used for describing various embodiments are described below. Obviously, the drawings in the following description are merely some embodiments of the present disclosure. For those skilled in the art, other drawings may be obtained in accordance with the drawings without creative efforts.

DETAILED DESCRIPTION

Figure 1:
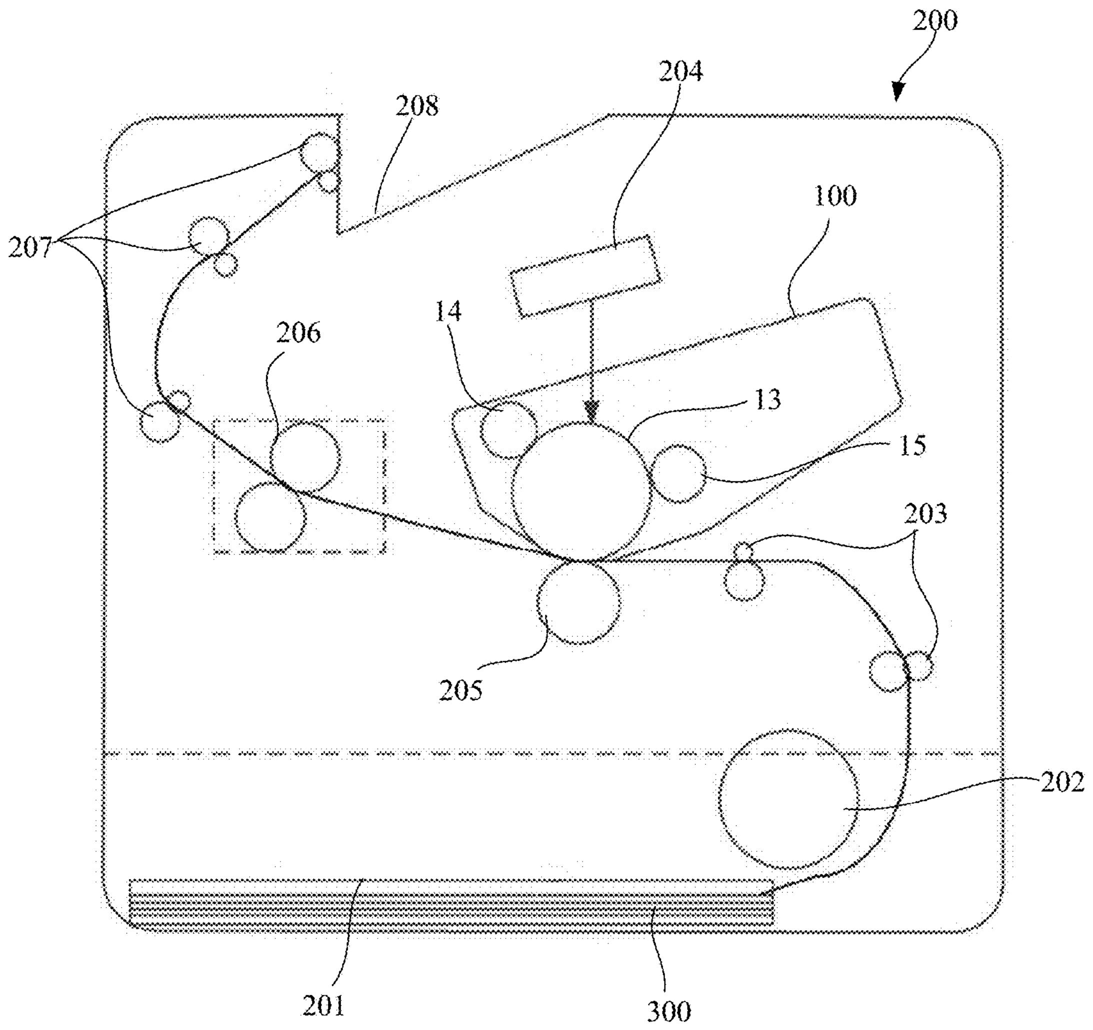
FIG. 1 illustrates a structural schematic of an image-forming apparatus provided by exemplary embodiments of the present disclosure.

In order to clearly describe the objectives, technical solutions and advantages of the present disclosure, the present disclosure is further described in detail with reference to the accompanying drawings and embodiments hereinafter. It should be understood that specific embodiments described herein are only configured to explain the present disclosure, but not to limit the present disclosure.

In the specification of the present disclosure, unless otherwise expressly specified and limited, the terms “first” and “second” are only used for the purpose of description and should not be construed as indicating or implying relative importance. Unless otherwise specified or explained, the term “plurality” refers to two or more; the terms “connection”, “fixation” and the like should be understood in a broad sense. For example, “connection” may be a fixed connection, a detachable connection, an integral connection, or an electrical connection; and may be a direct connection or an indirect connection through an intermediate medium. For those skilled in the art, specific meanings of above-mentioned terms in the present disclosure should be understood according to specific cases.

In the specification of the present disclosure, it should be understood that directional words such as “upper” and “lower” described in embodiments of the present disclosure are described from the angles shown in the drawings and should not be construed as a limitation on embodiments of the present disclosure. In addition, in the context of the present disclosure, it should also be understood that when an element may be referred to being “on” or “under” another element, it may not only be directly connected “on” or “under” another element, but also indirectly connected “on” or “under” another element through intermediate elements.

Exemplary Embodiment One

Referring to FIG. 1, embodiments of the present disclosure provide a process cartridge 100. The process cartridge 100 may be detachably installed on an image-forming apparatus 200. The image-forming apparatus 200 may include a paper tray 201, a paper feeding roller 202, a first conveying roller 203, a laser 204, a transferring roller 205, a fixing unit 206, a second conveying roller 207 and a paper discharge tray 208. The process cartridge 100 may include a main body 1. The main body may include a cartridge body 11, and/or an image-forming assembly, and/or a developing assembly. The cartridge body 11 may be disposed with an accommodating cavity for storing a developer (the developer may be, for example, toner); the image-forming assembly may at least include a photosensitive drum 13 and a charging roller 14; and the developing assembly may at least include a developing roller 15. The first conveying roller 203 may be configured on a paper feed path of the image-forming apparatus 200, and the second conveying roller 207 may be configured on a paper discharge path of the image-forming apparatus 200. The paper tray 201 may be configured to store the paper 300, the paper feeding roller 202 may be configured to convey the paper 300 stored in the paper tray 201 to the paper feed path, and the first conveying roller 203 may be configured to convey the paper 300 to the clamping region between the photosensitive drum 13 and the transferring roller 205. The charging roller 14 may be configured to charge the surface of the photosensitive drum 13, the laser 204 may be configured to emit a laser beam to form an electrostatic latent image on the surface of the photosensitive drum 13, and the developing roller 15 may be configured to convey the developer contained in the cartridge body 11 to the photosensitive drum and develop a developer image on the surface of the photosensitive drum 13. When the paper 300 passes through the clamping region of the photosensitive drum 13 and the transferring roller 205, the photosensitive drum 13 may transfer the developer image formed on the surface of the photosensitive drum 13 to the paper under the action of the transferring roller 205. The fixing unit 206 may be configured to fix the developer image on the paper 300, and the paper 300 after fixing may be transported to the discharge paper tray 208 through the second conveying roller 207. Obviously, it should be understood that above-mentioned image-forming apparatus 200 may be a typical structure, but the image-forming apparatus 200 may be other structure types, which may also be applied to the process cartridge and the detection method in the present disclosure.

During the printing process, there may be the following scenarios, such as environmental temperature and humidity may be too high or low; or circuit elements may be damaged or malfunctioned; or circuit transmission problems may exist. Above scenarios may all affect working stability of the process cartridge and the printing effect. If above problems cannot be identified in time, the printing effect may be affected, and printing media may be wasted.

The present disclosure provides the process cartridge 100 for detachably installation on the image-forming apparatus 200. The image-forming apparatus 200 may include the main body 1 and a working element. The main body 1 may be configured to store the developer, and the working element may be configured on the main body 1 to detect or obtain the first parameter related to the process cartridge 100. When the first parameter or the second parameter obtained based on the first parameter does not meet expectation, the image-forming apparatus 200 may control the process cartridge 100 to stop conveying the developer. When the process cartridge 100 is installed on the image-forming apparatus 200, the image-forming apparatus 200 may obtain the first parameter related to the process cartridge 100 or the second parameter obtained based on the first parameter according to the working element. When the first parameter or the second parameter does not meet expectation, the process cartridge 100 may stop conveying the developer, which may prevent the process cartridge 100 from affecting the printing effect during printing process due to too high or low environmental temperature and humidity, damaged or malfunctioned circuit elements, circuit transmission problems or the like.

Optionally, the working element may be a working environment sensor 2, where the working environment sensor 2 may be configured to detect the first parameter related to the process cartridge 100, and the image-forming apparatus 200 may obtain the first parameter; or the working element may be a fixed resistor and configured to enable the image-forming apparatus 200 to obtain the first parameter; or the working element may be an adjustable resistor and configured to enable the image-forming apparatus 200 to obtain the first parameter.

When the working element is the working environment sensor 2, the image-forming apparatus 200 may obtain environmental information of the process cartridge 100, such as temperature, humidity, light intensity and the like, through the working environment sensor 2, and stop conveying the developer when the environmental information does not meet expectation, which may prevent the developer from being affected by the environment and interfering with the printing effect. When the working element is the fixed resistor or the adjustable resistor, the image-forming apparatus 200 may obtain an electrical signal such as current and voltage of the process cartridge 100 through the fixed resistor or the adjustable resistor and stop conveying the developer when the electrical signal does not meet expectation. In such way, the circuit or electrical elements on the process cartridge 100 which are electrically connected to the image-forming apparatus 200 may be prevented from malfunctioning or being damaged. The malfunction and damage may result in inability to transmit information or transmission error and may affect the printing effect.

Optionally, above-mentioned adjustable resistor may be an active adjustable resistor. The active adjustable resistor may be configured to determine whether the circuit is operating normally. If the first parameter obtained by the image-forming apparatus 200 or the second parameter obtained based on the first parameter does not meet expectation, it indicates that the adjustable resistor or the circuit electrically connected to the image-forming apparatus may problems, which may affect information transmission.

Optionally, when the working element is the adjustable resistor, the adjustable resistor may include a switching element and at least two branch circuits. The switching element may be configured to receive command signals and switch to turn on or off different branch circuits to form the adjustable resistor with different resistance values for electrical connection with the image-forming apparatus. Through cooperation between at least two branch circuits and the switching element, different branch circuits may be turned on or off, and adjustable resistor with different resistance values may be formed. When the power supply is stable, the resistance adjustment of the adjustable resistor may cause the change of electrical characteristic coefficients such as voltage and current accordingly. If the change of the electrical characteristic coefficient does not meet expectation (for example, when the resistance value of the control adjustable resistor changes, corresponding electrical characteristic coefficient may not change accordingly, or the change cannot correspond to the resistance value), the working element or the circuit electrically connected between the working element and the image-forming apparatus may have problems.

Optionally, at least two branch circuits may be arranged in parallel, and different branch circuits may have different resistance values. The switching element may include at least two controlled switches, and a controlled switch may be configured on a branch circuit. Based on different command signals corresponding to different temperatures, different controlled switches may be turned on for conduction, such that one of the branch circuits may be turned on for conduction, and the other branch circuits may be turned off for disconnection. When different branch circuits are turned on for conduction, the adjustable resistor may have different resistance values. Or at least two branch circuits may be arranged in parallel, the switching element may include at least two controlled switches, and a controlled switch may be configured on a branch circuit. Based on different command signals corresponding to different temperature, different numbers of controlled switches may be turned on for conduction, and the adjustable resistor with different resistance values may be formed. When different controlled switches are turned on or off, the resistance value of the adjustable resistor may also change accordingly. At this point, the resistances of different branch circuits may be same or different.

Furthermore, the temperature in above-mentioned "different command signals corresponding to different temperatures" may be provided by a temperature sensor configured on the frame of the image-forming apparatus 200 or the process cartridge 100, and corresponding different command signals may be provided based on different temperatures.

In addition, when the working element is the adjustable resistor, the adjustable resistor may also be a potentiometer, a variable circuit or the like.

The following further illustrates that the working element is configured as the working environment sensor 2. It should be understood that the working element may also be configured as the fixed resistor or the adjustable resistor, or different types of working environment sensors 2 may cooperate with each other, or the working environment sensor 2 may cooperate with the fixed resistor or the adjustable resistor.

During the image-forming operation of the image-forming apparatus 200, heating or friction may cause the temperature of the process cartridge 100 to rise, and the developer stored in the process cartridge 100 may be affected by environmental parameters, such as temperature and humidity. If the environmental parameters of the process cartridge 100 are too high or low, the developer stored in the process cartridge 100 may clump, which may affect the developer transport and printing effect.

Figure 2:
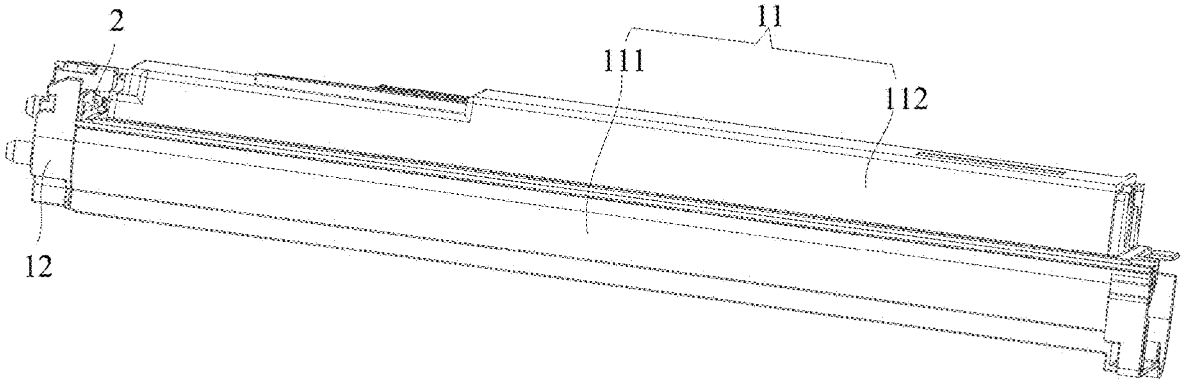
FIG. 2 illustrates a stereoscopic view of a process cartridge provided by exemplary embodiment one of the present disclosure.
Figure 3:
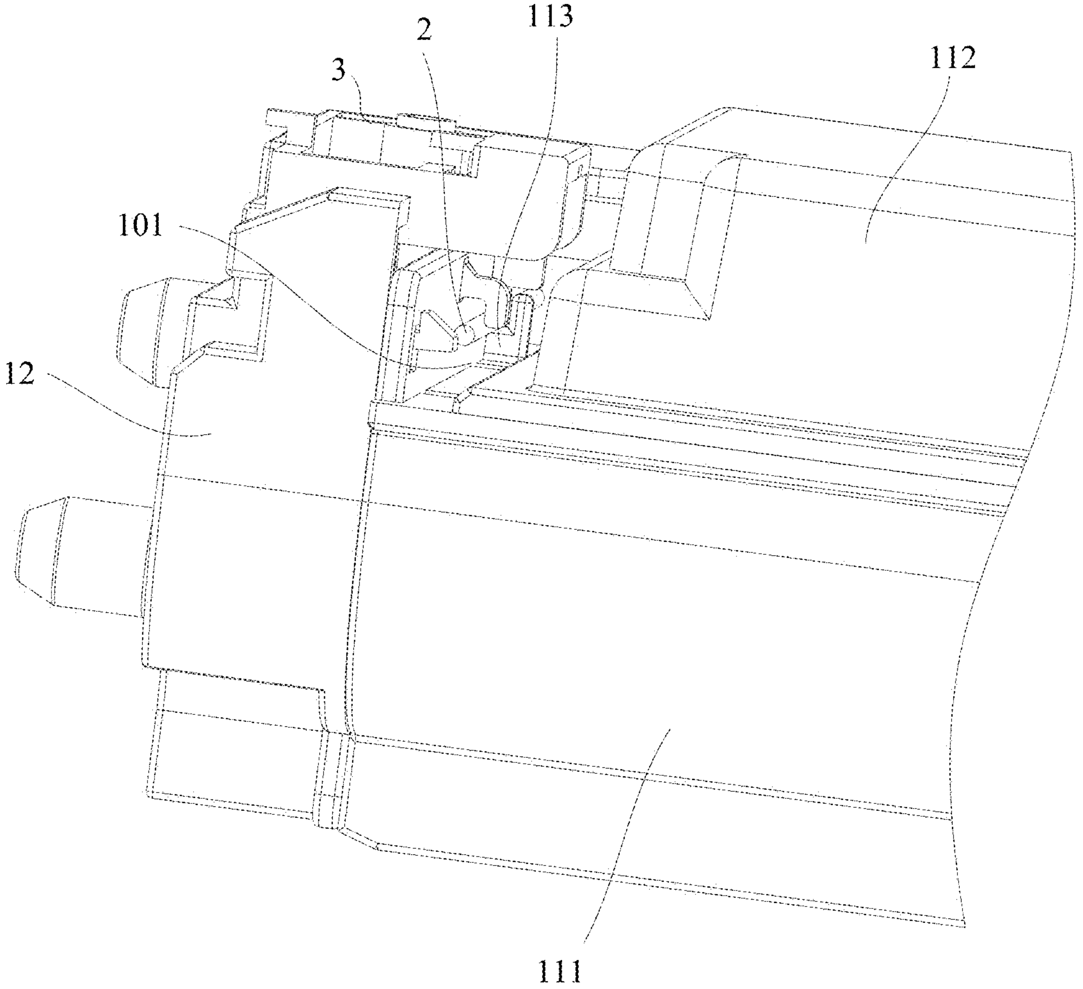
FIG. 3 illustrates a partial enlarged structural schematic of a process cartridge in FIG. 2.

As shown in FIGS. 2-3, the process cartridge 100 may also include an information processing apparatus 3 and the working environment sensor 2. The information processing apparatus 3 may be configured on the main body 1. The information processing apparatus 3 may be configured to communicate with the image-forming apparatus 200. Furthermore, the information processing apparatus 3 may be configured to store relevant parameters of the process cartridge 100, such as the type of the process cartridge 100, the number of printed pages, remaining developer, and other information. The working environment sensor 2 may be configured on the outer side or inner side of the main body 1 and configured to detect or obtain the first parameter related to the process cartridge 200. The first parameter may include temperature or humidity or the like, and may also include electrical characteristic parameters, which are configured to characterize temperature, humidity or the like, such as resistance value, current, voltage or the like. The device that obtains the first parameter may determine corresponding value based on the electrical characteristic parameters, such as temperature, humidity or the like. In embodiments of the present disclosure, the working environment sensor 2 may be configured to detect or obtain the first parameter related to the process cartridge 200. The working environment sensor 2 may directly detect and obtain above-mentioned first parameter, or the working environment sensor 2 may cooperate with other elements to detect and obtain above-mentioned first parameter, as long as the working environment sensor 2 participates in the detection of the first parameter. Above-mentioned first parameter may be configured to indicate the environment in which the main body 1 is located. When the process cartridge 100 is installed on the image-forming apparatus 200, the contact of the image-forming apparatus 200 may be electrically connected to the information processing apparatus 3 and the working environment sensor 2, such that the image-forming apparatus 200 may perform verification or data transmission with the process cartridge 100. It should be further explained that the contact of the image-forming apparatus 200 may be in direct or indirect contact with the working environment sensor 2. The information processing apparatus 3 may include a chip; and the chip may include a communication module. When the process cartridge 100 is installed in a preset position of the image-forming apparatus 200, the chip may communicate with the image-forming apparatus 200 through the communication module. It should be understood that the information processing apparatus 3 may include an external circuit in addition to the chip; that is, the information processing apparatus 3 may include the chip and the external circuit electrically connected to the chip.

It should also be understood that the number of chips of the information processing apparatus 3 may be multiple, where at least two chips may be electrically connected to each other; or at least two chips may be not electrically connected to each other and may respectively communicate with the image-forming apparatus 200.

Optionally, the information processing apparatus 3 may include the first unit and the second unit. The first unit may be electrically connected to the second unit, the storage module may be configured in the first unit, the first calculation module or the second calculation module may be configured in the second unit. One of the first unit and the second unit may be a chip, and another one of the first unit and the second unit may be a chip or an external circuit. That is, the storage module, the first calculation module, and the second calculation module may all be configured on a chip or an external circuit.

Obviously, it should be understood that if the working environment sensor 2 is configured as a fixed resistor or an adjustable resistor, the first parameter may be an electrical characteristic parameter, such as resistance value, current, voltage or the like.

In some embodiments, the information processing apparatus 3 may include a communication module. The communication module may be configured to communicate with the image-forming apparatus. The communication module and the working environment sensor 2 may be configured to be electrically connected to same or different contacts on the image-forming apparatus 200.

Furthermore, the communication module may include a data terminal, and the information processing apparatus 3 may be electrically connected to the image-forming apparatus 200 through the data terminal. For example, the data terminal may be in contact with and electrically connected to a contact pin, a contact point or a spring configured on the image-forming apparatus 200.

In addition, the communication module may also be a separate circuit module, such as an external circuit electrically connected to the chip.

In some embodiments, when the process cartridge 100 is installed on the image-forming apparatus 200, the communication module and the working environment sensor 2 may be electrically connected to same contact of the image-forming apparatus 200. At this point, same contact of the image-forming apparatus 200 may be used to realize communication with the information processing apparatus 3 and obtain the first parameter measured by the working environment sensor 2, which may reduce the number of contacts on the image-forming apparatus 200 and corresponding circuit settings, simplify the structure, and reduce costs.

In some embodiments, when the process cartridge 100 is installed on the image-forming apparatus 200, the communication module and the working environment sensor 2 may be electrically connected to different contacts on the image-forming apparatus 200, respectively. For example, the information processing apparatus 3 may include a transmission terminal different from the data terminal, the working environment sensor 2 may be electrically connected to a contact of the image-forming apparatus 200 through the transmission terminal on the information processing apparatus 3, and the data terminal on the information processing apparatus 3 may be electrically connected to another contact of the image-forming apparatus 200. Or the information processing apparatus 3 may be not configured with the transmission terminal for being electrically connected to the working environment sensor 2. The working environment sensor 2 may be directly and electrically connected to a contact of the image-forming apparatus 200 not through the information processing apparatus 3, and the data terminal on the information processing apparatus 3 may be electrically connected to another contact of the image-forming apparatus 200.

In some embodiments, when the first parameter or the second parameter obtained based on the first parameter does not meet expectation, the image-forming apparatus 200 may control the process cartridge 100 to stop conveying the developer. Exemplarily, taking the first parameter is temperature as an example, when the process cartridge 100 is installed on the image-forming apparatus 200, the working environment sensor 2 may detect the temperature of the main body 1 in real time, and the image-forming apparatus 200 may obtain the temperature of the main body 1. When the temperature of the main body 1 is too high or low, the image-forming apparatus 200 may stop performing the image-forming operation and may perform cool down operation until the temperature of the main body 1 drops to a preset temperature range, and then restart the image-forming operation, which may prevent the developer from clumping due to too high or low internal temperature of the process cartridge 100 during the image formation process. Obviously, the working environment sensor 2 may also be a sensor capable of obtaining other types of the first parameter of the process cartridge 100, such as humidity and other information.

Figure 4:
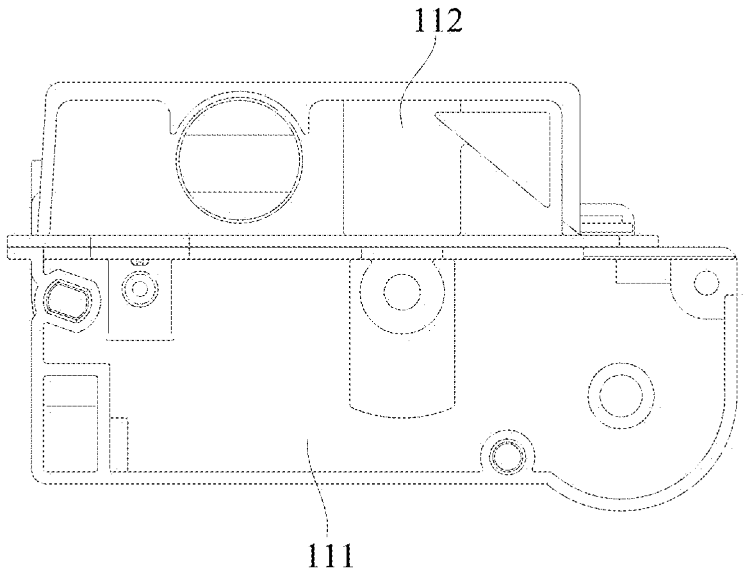
FIG. 4 illustrates a side view of a process cartridge provided by exemplary embodiment one of the present disclosure.

In one embodiment, the working environment sensor 2 may be configured at the outer side of the main body 1. For example, the cartridge body 11 may include a base 111 and an upper cover 112. The upper cover 112 and the base 111 may be connected to form an accommodating cavity configured to accommodate the developer, as shown in FIG. 4. The main body 1 may also include an end cover 12. The end cover 12 may be installed at the end portion of the base 111. The end cover 12, the upper cover 112 and the base 111 may form an installation cavity 101. The installation cavity 101 may be configured to be adjacent to the accommodating cavity of the cartridge body 11. The installation cavity 101 may be an installation space, an installation groove, an installation hole, an installation opening or the like. Exemplarily, the end cover 12 may be configured to an inverted L shape. The lower portion of the end cover 12 may be connected to the end portion of the base 111, and the upper portion of the end cover 12 may be spaced apart from the base 111, such that the upper portion of the end cover 12, the base 111 and the upper cover 112 may enclose the installation cavity 101. The working environment sensor 2 may be inserted from outside the installation cavity 101 to inside the installation cavity 101, such that the working environment sensor 2 may be at least partially in the installation cavity 101. The information processing apparatus 3 may be installed on the end cover 12, or the base 111 or the upper cover 112. In one embodiment, the working environment sensor 2 may be configured at the outer side of the main body 1 to prevent the working environment sensor 2 from being contaminated by the developer; and the working environment sensor 2 may be configured to be adjacent to the cartridge body 11 to improve the detection accuracy.

In one embodiment, the cartridge body 11 may include two independent parts, that is, the base 111 and the upper cover 112. It may be understood that in other embodiments, the cartridge body 11 may also be integrally formed, and the end cover 12 may be installed at the end portion of the cartridge body 11, such that the end cover 12 and the cartridge body 11 may enclose the installation cavity for installing the working environment sensor 2. In order to facilitate the installation of the working environment sensor 2, the cartridge body 11 may also include an installation part 113. The installation part 113 may be connected to at least one of the cartridge body 11 and the end cover 12. Furthermore, the installation part 113 may be configured with an opening. The working environment sensor 2 may be inserted into the opening of the installation part 113 from outside the installation cavity 101 to inside the installation cavity 101, such that the working environment sensor 2 may be installed at the position of the opening of the installation part 113. Exemplarily, the installation part 113 may be connected to the base 111 or the upper cover 112.

In one embodiment, the working environment sensor 2 may be electrically connected to the information processing apparatus 3 in a detachable manner. Exemplarily, the process cartridge 100 may also include a socket. The socket may be configured in the cartridge body 11 and electrically connected to the information processing apparatus 3. The working environment sensor 2 may include a temperature measuring portion, a connecting portion and a plug. The connecting portion may be connected to the temperature measuring portion. The connection portion may be installed at the opening of the installation part 113 and located in the installation cavity 101. The temperature measuring portion may be configured to be closer to the cartridge body 11 than the connecting portion and used to detect the first parameter of the cartridge body 11. The connecting portion may be electrically connected to the plug, and the plug may be detachably plugged into the socket, thereby realizing detachable electrical connection between the working environment sensor 2 and the information processing apparatus 3.

In one embodiment, the temperature measuring portion of the working environment sensor 2 may be configured to be in the installation cavity 101 and adjacent to the cartridge body 11, such that the temperature measured by the temperature measuring portion of the working environment sensor 2 may be closer to the temperature in the accommodation cavity. Moreover, the temperature measuring portion of the working environment sensor 2 may be in the installation cavity 101, which may be desirably protected and not easily disturbed by other environments or conditions. For example, the heat generated by other parts in the image-forming apparatus 200 during operation may not directly affect the temperature measurement of the temperature measuring portion. In addition, the working environment sensor 2 may be configured to be at the outer side of the main body 1 instead of extending into the accommodating cavity, which may prevent carbon toner from contaminating the working environment sensor 2 and affecting the detection accuracy. Furthermore, it does not need a wire leading from the accommodating cavity to the outside of the working environment sensor 2, which may improve the sealing and prevent toner leakage.

Furthermore, the socket and the information processing apparatus 3 may form into an integral structure; or the socket and the end cover 12 may form into an integral structure; or the socket and the cartridge body 11 may form into an integral structure. For example, the socket and the base 111 may form into an integral structure; or the socket and the upper cover 112 may form into an integral structure. The working environment sensor 2 may be a temperature sensor in a rod-shaped structure which may be convenient to be inserted into the installation cavity 101. For example, the working environment sensor 2 may be a thermistor or a thermocouple.

In some embodiments, when the communication module and the working environment sensor 2 are configured to be electrically connected to same contact of the image-forming apparatus, the communication module may include the data terminal.

The working environment sensor 2 may be electrically connected to the information processing apparatus 3. When the process cartridge 100 is installed at a preset position on the image-forming apparatus 200, the working environment sensor 2 may be electrically connected to the image-forming apparatus 200 through the data terminal of the information processing apparatus.

Or the process cartridge 100 may include the first conductive part. The first end of the first conductive part may be electrically connected to the working environment sensor 2, and the second end of the first conductive part may be spaced apart from the data terminal of the information processing apparatus 3. When the process cartridge 100 is installed at the preset position on the image-forming apparatus 200, the second end of the first conductive part and the data terminal of the information processing apparatus 3 may be electrically connected to same contact of the image-forming apparatus 200, such that the working environment sensor 2 may be electrically connected to the image-forming apparatus 200 through the first conductive part. Exemplarily, when the process cartridge 100 is not installed on the image-forming apparatus 200, the second end of the first conductive part may be spaced apart from and not electrically connected to the data terminal of the information processing apparatus 3. When the process cartridge 100 is installed at the preset position on the image-forming apparatus 200, the second end of the first conductive part and the data terminal of the information processing apparatus 3 may be still in a spaced-apart state, but the second end of the first conductive part and the data terminal of the information processing apparatus 3 may be both electrically connected to same contact point on the image-forming apparatus 200. Or when the process cartridge 100 is installed at the preset position on the image-forming apparatus 200, the second end of the first conductive part may be in contact with the data terminal of the information processing apparatus 3, thereby realizing electrical connection between the second end of the first conductive part and the data terminal of the information processing apparatus 3. Moreover, the data terminal of the information processing apparatus 3 may be electrically connected to the contact of the image-forming apparatus 200, such that the working environment sensor 2 may be electrically connected to the image-forming apparatus 200 through the information processing apparatus 3.

Or the process cartridge 100 may also include the second conductive part. The first end of the second conductive part may be electrically connected to the working environment sensor 2; and projections of the second end of the second conductive part and the data terminal of the information processing apparatus 3 along the direction perpendicular to the information processing apparatus 3 may be at least partially overlapped with each other. In addition, the side surface of the second end of the second conductive part away from the data terminal of the information processing apparatus 3 may be a conductive surface, and the side surface of the second end of the second conductive part adjacent to the data terminal of the information processing apparatus 3 may be an insulating surface, such that the conductive surface may be insulated from the data terminal of the information processing apparatus 3. When the process cartridge 100 is installed at the preset position on the image-forming apparatus 200, the second end of the second conductive part and the data terminal of the information processing apparatus 3 may be electrically connected to same contact point on the image-forming apparatus 200. Exemplarily, the second end of the second conductive part may be in contact with the data terminal of the information processing apparatus 3, but the surface where the second end of the second conductive part is in contact with the data terminal of the information processing apparatus 3 may be an insulating surface, such that the second end of the second conductive part may be not electrically connected to the data terminal of the information processing apparatus 3. However, when the process cartridge is installed at the preset position on the image-forming apparatus 200, the second end of the second conductive part and the data terminal of the information processing apparatus 3 may be both electrically connected to same contact of the image-forming apparatus 200.

In other embodiments, when the working environment sensor 2 is electrically connected to the information processing apparatus 3, an input portion may be configured on the information processing apparatus 3. The input portion may be electrically connected to the data terminal of the information processing apparatus 3; and the working environment sensor 2 may be electrically connected to the input portion, such that the working environment sensor 2 may be electrically connected to the data terminal of the information processing apparatus 3 through the input portion.

Or the process cartridge 100 may also include the third conductive part. The first end of the third conductive part may be electrically connected to the working environment sensor 2, and the second end of the third conductive part may be electrically connected to the data terminal of the information processing apparatus 3, such that the working environment sensor 2 may be electrically connected to the data terminal of the information processing apparatus 3 through the third conductive part. When the process cartridge 100 is installed at the preset position on the image-forming apparatus 200, the working environment sensor 2 may be electrically connected to the image-forming apparatus 200 through the data terminal of the information processing apparatus 3. The working environment sensor 2 may transmit measured data to the image-forming apparatus 200 through the information processing apparatus 3, and there is no need to respectively configure new contacts on the process cartridge 100 and the image-forming apparatus 200, such that the structure may be simple with low cost.

In one embodiment, the information processing apparatus 3 may be configured on the end cover 12, and the working environment sensor 2 may be configured in the installation cavity 101 enclosed by the end cover 12 and the cartridge body 11. It may be understood that in other embodiments, the information processing apparatus 3 and the working environment sensor 2 may also be configured at other positions of the main body 1. Exemplarily, one of the information processing apparatus 3 and the working environment sensor 2 may be configured on the image-forming assembly, and another one of the information processing apparatus 3 and the working environment sensor 2 may be configured on the developing assembly. The image-forming assembly may include a photosensitive drum, and the developing assembly may include a developing roller. Or the main body 1 may include a developer accommodating cavity and an image-forming assembly; the developer accommodating cavity may be configured to accommodate the developer; the image-forming assembly may include the photosensitive drum; one of the information processing apparatus 3 and the working environment sensor 2 may be configured on the image-forming assembly; and another one of the information processing apparatus 3 and the working environment sensor 2 may be configured on the developer accommodating cavity. Or the main body 1 may include the developer accommodating cavity and the developing assembly; the developer accommodating cavity may be configured to accommodate the developer; the developing assembly may include developing roller; one of the information processing apparatus 3 and the working environment sensor 2 may be configured on the developing assembly; and another one of the information processing apparatus 3 and the working environment sensor 2 may be configured on the developer accommodating cavity. Or the main body 1 may include the developer accommodating cavity, the developing assembly and the image-forming assembly; the developer accommodating cavity may be configured to accommodate the developer; the image-forming assembly may include the photosensitive drum; the developing assembly may include the developing roller; and one of the information processing apparatus 3 and the working environment sensor 2 may be configured on one of the developer accommodating cavity, the developing assembly and the image-forming assembly; and another one of the information processing apparatus 3 and the working environment sensor 2 may be configured on another one of the developer accommodating cavity, the developing assembly and the image-forming assembly. Or the main body 1 may include the developer accommodating cavity configured to accommodate the developer, and the information processing apparatus 3 and the working environment sensor 2 may be configured on the developer accommodating cavity. Or the main body 1 may include the image-forming assembly, the image-forming assembly may include the photosensitive drum, and the information processing apparatus 3 and the working environment sensor 2 may be configured on the image-forming assembly.

Embodiments of the present disclosure further provide a detection method, which may include the following exemplary steps:

- obtaining the first parameter related to the process cartridge 100;
- determining whether the first parameter or the second parameter obtained based on the first parameter meets expectation; and
- when the first parameter or the second parameter obtained based on the first parameter does not meet expectation, controlling the process cartridge 100 to stop conveying the developer.

By detecting the first parameter related to the process cartridge 100, when the first parameter or the second parameter obtained based on the first parameter does not meet expectation, the image-forming apparatus 200 may stop the process cartridge 100 from conveying the developer, which may prevent the process cartridge 100 from clumping and affecting the printing effect due to internal environmental parameters being too high or low during the printing process.

Furthermore, when the first parameter or the second parameter obtained based on the first parameter does not meet expectation, controlling the process cartridge 100 to stop conveying the developer may further include the following exemplary steps:

- turning on cooling and/or dehumidification until the first parameter or the second parameter meets expectation.

Through cooling and/or dehumidification measures, the environment of the process cartridge 100 may be improved, and the system may re-enter the standby or printing state.

Furthermore, above-mentioned determination of whether the first parameter or the second parameter obtained based on the first parameter meets expectation may further include the following exemplary steps:

- comparing the first parameter with the first preset parameter range; and if the first parameter is not within the first preset parameter range, determining that expectation is not met; or
- comparing the second parameter with the second preset parameter range; and if the second parameter is not within the second preset parameter range, determining that expectation is not met.

Optionally, above-mentioned process cartridge 100 stops conveying the developer, which may have different following scenarios based on different states of the image-forming apparatus 200.

For example, when the image-forming apparatus 200 is in a standby state, if the first parameter or the second parameter obtained based on the first parameter does not meet expectation, even if it is necessary to enter the printing state, the process cartridge 100 may still maintain not conveying the developer and may not enter the printing state; and when the image-forming apparatus 200 is in a printing state, if the first parameter or the second parameter obtained based on the first parameter does not meet expectation, the process cartridge 100 may change from conveying the developer to not conveying the developer, or the process cartridge 100 may maintain not conveying the developer.

It should be understood that there is a case that the first parameter is higher or lower than the first preset parameter range, which may result in that the first parameter does not meet expectation.

It should be understood that there is a case that the second parameter is higher or lower than the second preset parameter range, which may result in that the second parameter does not meet expectation.

Optionally, when the first parameter is higher than the first preset parameter range or the second parameter is higher than the second preset parameter range, the image-forming apparatus 200 may turn on cooling. The first preset parameter range and the second preset parameter range may be a fixed value, or a set of at least two fixed values, or a numerical range. The first parameter may be higher than the first preset parameter range or the second parameter may be higher than the second preset parameter range; that is, the first parameter may be higher than the upper limit of the first preset parameter range or the second parameter may be higher than the upper limit of the second preset parameter range.

Furthermore, when the first parameter is higher than the first preset parameter range or the second parameter is higher than the second preset parameter range, the image-forming apparatus 200 may turn on the cooling fan; or the image-forming apparatus 200 may increase the rotation speed of the cooling fan.

Furthermore, when the first parameter is reduced to within the first preset parameter range or the second parameter is reduced to within the second preset parameter range, the image-forming apparatus 200 may turn off the cooling fan or reduce the rotation speed of the cooling fan. Or considering that the first parameter frequently exceeds or falls within the first preset parameter range to cause the cooling fan to switch on and off or adjust the rotation speed too frequently, a reference parameter may also be configure. The reference parameter may be lower than the upper limit of the first preset parameter range, and a certain difference may be between the reference parameter and the upper limit. When the first parameter is lower than above-mentioned reference parameter, the image-forming apparatus 200 may turn off the cooling fan or reduce the rotation speed of the cooling fan. Same principle may apply when the second parameter affects the image-forming apparatus 200 to turn off the cooling fan or reduce the rotation speed of the cooling fan.

Exemplarily, during the image-forming operation of the image-forming apparatus 200, when the temperature detected by the temperature sensor exceeds T1, the image-forming apparatus 200 may stop working, and the cooling fan of the image-forming apparatus 200 may work to remove the heat in the image-forming apparatus 200 to the outside through exhaust and cool the image-forming apparatus 200 for a certain period of time. After t1 time has passed, it determines whether the temperature detected by the temperature sensor drops to T2 or below. When it determines that the temperature detected by the temperature sensor is reduced to T2 or below, the image-forming apparatus 200 may continue to perform the image-forming operation; otherwise, the cooling operation may continue. When it determines that the temperature detected by the temperature sensor is reduced to T2 or below, the image-forming apparatus 200 may continue to perform the image-forming operation.

It should be noted that, in embodiments of the present disclosure, the second parameter obtained based on the first parameter may be same or different data type as the first parameter, the values of the first parameter and the second parameter may be same or different, and the second parameter may also be calculated and generated based on the first parameter combined with a preset algorithm or associated information, which may not be limited in embodiments of the present disclosure. Exemplarily, the second parameter may be determined based on the first parameter, which may refer to exemplary embodiment six.

Exemplary Embodiment Two

Figure 5:
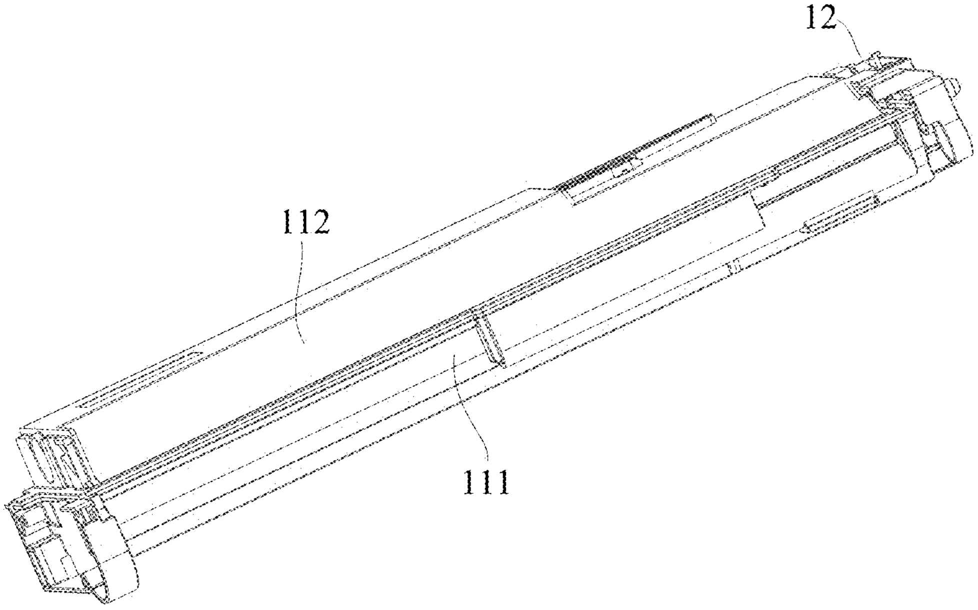
FIG. 5 illustrates a stereoscopic view of a process cartridge provided by exemplary embodiment two of the present disclosure.
Figure 6:
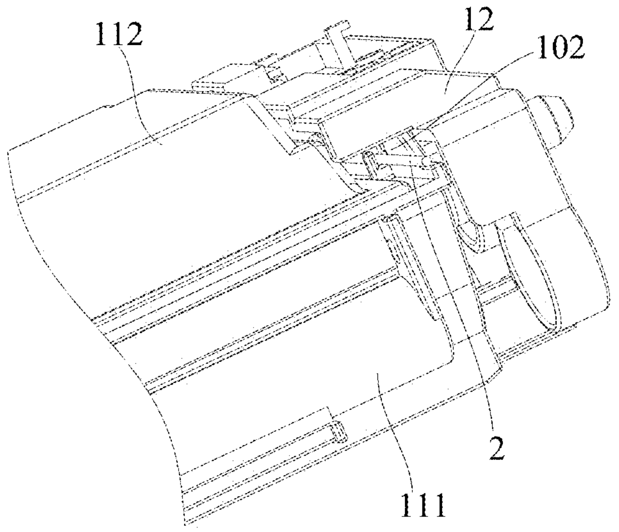
FIG. 6 illustrates a partial enlarged structural schematic of a process cartridge in FIG. 5.

Referring to FIGS. 5-6, based on exemplary embodiment one, embodiments of the present disclosure further provide another process cartridge. The difference between exemplary embodiment two and exemplary embodiment one is that in exemplary embodiment two, the process cartridge 100 may include the main body 1 and the information processing apparatus 3 configured on the main body 1 but may not include the working element. The information processing apparatus 3 may be configured on the main body 1, and the first installation position 102 may be configured on the inner side or the outer side of the main body 1, and the first installation position 102 may be configured to install the working element. When the first parameter or the second parameter obtained based on the first parameter does not meet expectation, the process cartridge 100 may stop conveying the developer.

The working element configured as the working environment sensor 2 is described hereinafter. It should be understood that the working element may also be configured as the fixed resistor or the adjustable resistor, or different types of working environment sensors 2 may cooperate with each other, or the working environment sensor 2 may cooperate with the fixed resistor or the adjustable resistor.

In some embodiments, when the working environment sensor 2 is installed at the first installation position 102 and when the process cartridge 100 is installed on the image-forming apparatus 200, the communication module and the working environment sensor 2 may be electrically connected to same contact of the image-forming apparatus 200. At this point, same contact of the image-forming apparatus 200 may be configured to realize communication with the information processing apparatus 3 and obtain the first parameter measured by the working environment sensor 2, which may reduce the number of contacts on the image-forming apparatus 200 and corresponding circuit settings, simplify the structure, and reduce costs.

In some embodiments, when the working environment sensor 2 is installed at the first installation position 102 and when the process cartridge 100 is installed on the image-forming apparatus 200, the communication module and the working environment sensor 2 may be electrically connected to different contacts on the image-forming apparatus 200, respectively. For example, the information processing apparatus 3 may include the transmission terminal different from the data terminal, the working environment sensor 2 may be electrically connected to a contact of the image-forming apparatus 200 through the transmission terminal on the information processing apparatus 3, and the data terminal on the information processing apparatus 3 may be electrically connected to another contact of the image-forming apparatus 200. Or the information processing apparatus 3 may not include the transmission terminal for being electrically connected to the working environment sensor 2. The working environment sensor 2 may be directly and electrically connected to a contact of the image-forming apparatus 200 not through the information processing apparatus 3; and the data terminal on the information processing apparatus 3 may be electrically connected to another contact of the image-forming apparatus 200.

For example, the first installation position 102 may be at the outer side or inner side of the main body 1. When the first installation position 102 is configured at the outer side of the main body 1, the first installation position 102 may be an installation cavity formed at the outer side of the main body 1. Exemplarily, the main body 1 may include the cartridge body 11 and the end cover 12; and the cartridge body 11 may include the accommodating cavity for accommodating the developer. The end cover 12 may be installed at the end portion of the cartridge body 11, such that the end cover 12 and the cartridge body 11 may form the installation cavity. When the working environment sensor 2 is installed at the first installation position 102, the working environment sensor 2 may be at least partially in the installation cavity.

In some embodiments, the information processing apparatus 3 may be configured with an input portion electrically connected to the data terminal. The input portion may be configured to be electrically connected to the working environment sensor 2, such that the working environment sensor 2 may be electrically connected to the data terminal of the information processing apparatus 3 through the input portion. Or the process cartridge 100 may also include the third conductive part. The first end of the third conductive part may be configured to be electrically connected to the working environment sensor 2, and the second end of the third conductive part may be electrically connected to the data terminal of the information processing apparatus 3, such that the working environment sensor 2 may be electrically connected to the data terminal of the information processing apparatus 3 through the third conductive part. When the process cartridge 100 is installed at the preset position on the image-forming apparatus 200, the working environment sensor 2 may be electrically connected to the image-forming apparatus 200 through the data terminal of the information processing apparatus 3.

In other embodiments, the information processing apparatus 3 may be configured with the first assembly position, and the process cartridge 100 may further include the first conductive part. The first end of the first conductive part may be configured to be electrically connected to the working environment sensor 2, and the second end of the first conductive part may be installed at the first assembly position, such that the second end of the first conductive part may be configured to be spaced apart from the data terminal of the information processing apparatus 3. When the process cartridge 100 is installed at the preset position on the image-forming apparatus 200, the second end of the first conductive part and the data terminal of the information processing apparatus 3 may be electrically connected to same contact of the image-forming apparatus 200, such that the working environment sensor 2 may be electrically connected to the image-forming apparatus 200 through the first conductive part. Exemplarily, when the process cartridge 100 is not installed on the image-forming apparatus 200, the second end of the first conductive part may be configured to be spaced apart from and not electrically connected to the data terminal of the information processing apparatus 3; and when the process cartridge 100 is installed at the preset position on the image-forming apparatus 200, the second end of the first conductive part and the data terminal of the information processing apparatus 3 may be still in a spaced-apart state, but the second end of the first conductive part and the data terminal of the information processing apparatus 3 may be respectively and electrically connected to same contact point on the image-forming apparatus 200. Or when the process cartridge 100 is installed at the preset position on the image-forming apparatus 200, the second end of the first conductive part may also in contact with the data terminal of the information processing apparatus 3, such that the second end of the first conductive part may be electrically connected to the data terminal of the information processing apparatus 3; and the data terminal of the information processing apparatus 3 may be electrically connected to the contact of the image-forming apparatus 200, such that the working environment sensor 2 may be electrically connected to the image-forming apparatus 200 through the information processing apparatus 3.

In other embodiments, the information processing apparatus 3 may further be configured with the first assembly position, and the process cartridge 100 may further include the second conductive part. The first end of the second conductive part may be configured to be electrically connected to the working environment sensor 2, and the second end of the second conductive part may be installed at the first assembly position, such that the projections of the second end of the second conductive part and the data terminal of the information processing apparatus 3 along the direction perpendicular to the information processing apparatus 3 may be at least partially overlapped with each other. Moreover, the side surface of the second end of the second conductive part away from the data terminal of the information processing apparatus 3 may be a conductive surface, and the side surface of the second end of the second conductive part adjacent to the data terminal of the information processing apparatus 3 may be an insulating surface, such that the conductive surface may be insulated from the data terminal of the information processing apparatus 3. When the process cartridge 100 is installed at the preset position on the image-forming apparatus 200, the second end of the second conductive part and the data terminal of the information processing apparatus 3 may be electrically connected to same contact point on the image-forming apparatus 200. Exemplarily, the second end of the second conductive part may be in contact with the data terminal of the information processing apparatus 3, but the surface where the second end of the second conductive part is in contact with the data terminal of the information processing apparatus 3 may be an insulating surface, such that the second end of the second conductive part may be not electrically connected to the data terminal of the information processing apparatus 3. However, when the process cartridge 100 is installed at the preset position on the image-forming apparatus 200, the second end of the second conductive part and the data terminal of the information processing apparatus 3 may be both electrically connected to same contact of the image-forming apparatus 200.

In one embodiment, the information processing apparatus 3 may be configured on the end cover 12, and the first installation position 102 may be the installation cavity surrounded by the end cover 12 and the cartridge body 11. It may be understood that in other embodiments, the information processing apparatus 3 and the first installation position 102 may also be configured at other positions of the main body 1. Exemplarily, one of the information processing apparatus 3 and the first installation position 102 may be configured on the image-forming assembly, and another one of the information processing apparatus 3 and the first installation position 102 may be configured on the developing assembly. The image-forming assembly may include the photosensitive drum, and the developing assembly may include the developing roller. Or the main body 1 may include the developer accommodating cavity and the image-forming assembly; the developer accommodating cavity may be configured to accommodate the developer; the image-forming assembly may include the photosensitive drum; one of the information processing apparatus 3 and the first installation position 102 may be configured on the image-forming assembly; and another one of the information processing apparatus 3 and the first installation position 102 may be configured on the developer accommodating cavity. Or the main body 1 may include the developer accommodating cavity and the developing assembly; the developer accommodating cavity may be configured to accommodate the developer; the developing assembly may include the developing roller; one of the information processing apparatus 3 and the first installation position 102 may be configured on the developing assembly, and another one of the information processing apparatus 3 and the first installation position 102 may be configured on the developer accommodating cavity. Or the main body 1 may include the developer accommodating cavity, the developing assembly and the image-forming assembly; the developer accommodating cavity may be configured to accommodate the developer; the image-forming assembly may include the photosensitive drum; the developing assembly may include the developing roller; one of the information processing apparatus 3 and the first installation position 102 may be configured on one of the developer accommodating cavity, the developing assembly and the image-forming assembly; and another one of the information processing apparatus 3 and the first installation position 102 may be configured on another one of the developer accommodating cavity, the developing assembly and the image-forming assembly. Or the main body 1 may include the developer accommodating cavity configured to accommodate the developer; and the information processing apparatus 3 and the first installation position 102 may be configured on the developer accommodating cavity. Or the main body 1 may include the developing assembly; the developing assembly may include the developing roller; and the information processing apparatus 3 and the first installation position 102 may be configured on the developing assembly. Or the main body 1 may include the image-forming assembly; the image-forming assembly may include the photosensitive drum; and the information processing apparatus 3 and the first installation position 102 may be configured on the image-forming assembly.

It should be noted that, in embodiments of the present disclosure, the second parameter obtained based on the first parameter may be same or different data type as the first parameter. The values of the first parameter and the second parameter may be same or different, and the second parameter may also be calculated and generated based on the first parameter combined with a preset algorithm or associated information, which may not be limited in embodiments of the present disclosure. Exemplarily, the second parameter may be determined based on the first parameter, which may refer to exemplary embodiment six.

Exemplary Embodiment Three

Figure 7:
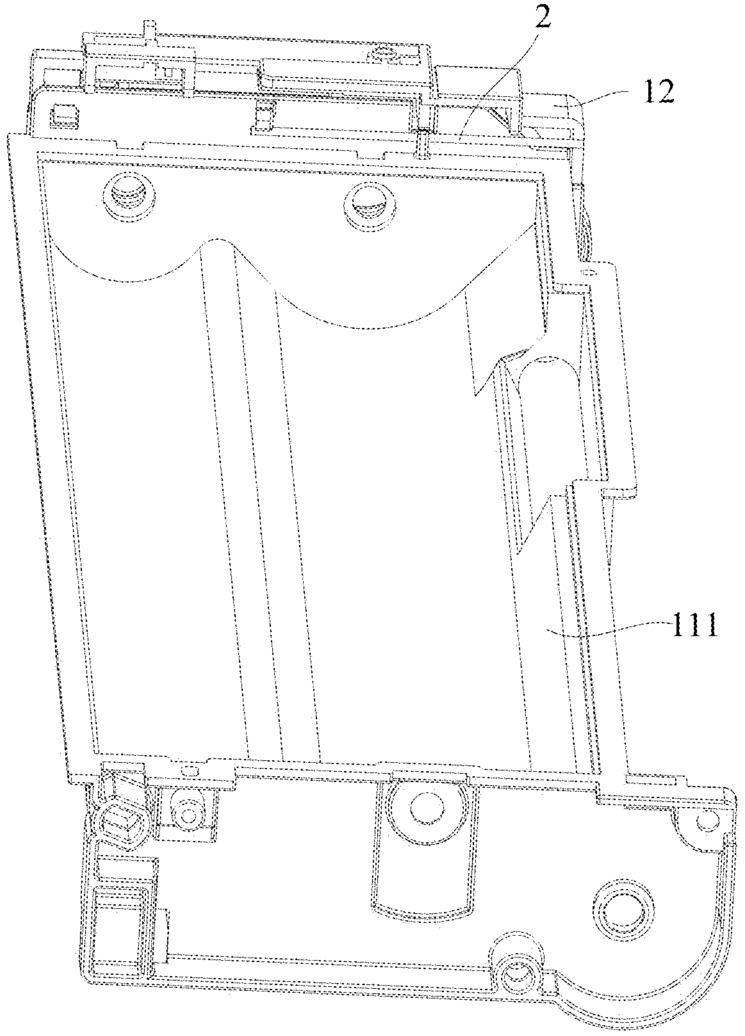
FIG. 7 illustrates a stereoscopic view of a process cartridge provided by exemplary embodiment three of the present disclosure.
Figure 8:
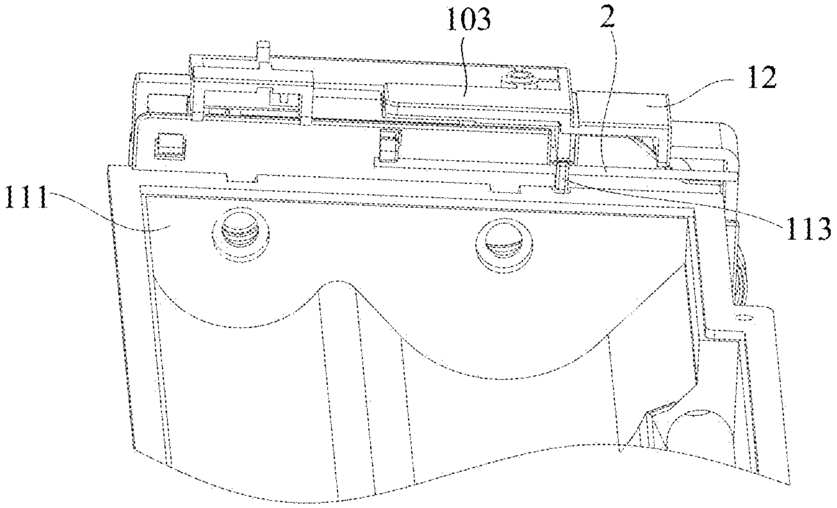
FIG. 8 illustrates a partial enlarged structural schematic of a process cartridge in FIG. 7.

Referring to FIGS. 7-8, based on exemplary embodiment one, embodiments of the present disclosure further provide another process cartridge 100. The main difference between exemplary embodiment three and exemplary embodiment one is that in exemplary embodiment three, the process cartridge 100 may include the main body 1 and the working element but may not include the information processing apparatus 3. The working element may be configured on the outer side or inner side of the main body 1 and configured to detect or obtain the first parameter related to the process cartridge 200; and the main body 1 may be configured with the second installation position 103 for installing the information processing apparatus 3. When the first parameter or the second parameter obtained based on the first parameter does not meet expectation, the process cartridge 100 may stop conveying the developer.

The working element configured as the working environment sensor 2 is described hereinafter. It should be understood that the working element may also be configured as the fixed resistor or the adjustable resistor, or different types of working environment sensors 2 may cooperate with each other, or the working environment sensor 2 may cooperate with the fixed resistor or the adjustable resistor.

In one embodiment, the working environment sensor 2 may be configured at the outer side of the main body 1. For example, the cartridge body 11 may include the base 111 and the upper cover 112; and the upper cover 112 and the base 111 may be connected to enclose the accommodating cavity configured to accommodate the developer. The main body 1 may also include the end cover 12 installed at the end portion of the base 111; and the end cover 12, the upper cover 112, and the base 111 may enclose the installation cavity 101. The installation cavity 101 may be configured to be adjacent to the accommodating cavity of the cartridge body 11, where the installation cavity 101 may be an installation space, an installation groove, an installation hole, an installation opening or the like. Exemplarily, the end cover 12 may be configured to an inverted L shape, the lower portion of the end cover 12 may be connected to the end portion of the base 111; and the upper portion of the end cover 12 may be configured to be spaced apart from the base 111, such that the upper portion of the end cover 12, the base 111 and the upper cover 112 may enclose the installation cavity 101. The working environment sensor 2 may be at least partially in the installation cavity 101. The information processing apparatus 3 may be installed on the end cover 12, or on the base 111 or the upper cover 112.

In some embodiments, when the information processing apparatus 3 is installed on the second installation position 103 and when the process cartridge 100 is installed on the image-forming apparatus 200, the communication module and the working environment sensor 2 may be electrically connected to same contact of the image-forming apparatus 200. At this point, same contact of the image-forming apparatus 200 may be configured to realize communication with the information processing apparatus 3 and obtain the first parameter measured by the working environment sensor 2, which may reduce the number of contacts on the image-forming apparatus 200 and corresponding circuit settings, simplify the structure, and reduce costs.

In some embodiments, when the information processing apparatus 3 is installed on the second installation position 103 and when the process cartridge 100 is installed on the image-forming apparatus 200, the communication module and the working environment sensor 2 may be electrically connected to different contacts on the image-forming apparatus 200. For example, the information processing apparatus 3 may include the transmission terminal different from the data terminal, the working environment sensor 2 may be electrically connected to a contact of the image-forming apparatus 200 through the transmission terminal on the information processing apparatus 3, and the data terminal on the information processing apparatus 3 may be electrically connected to another contact of the image-forming apparatus 200. Or the information processing apparatus 3 may be not configured with the transmission terminal for being electrically connected to the working environment sensor 2. The working environment sensor 2 may be directly and electrically connected to a contact of the image-forming apparatus 200 not through the information processing apparatus 3; and the data terminal on the information processing apparatus 3 may be electrically connected to another contact of the image-forming apparatus 200.

In some embodiments, the information processing apparatus 3 may be configured with the input portion electrically connected to the data terminal. When the information processing apparatus 3 is installed on the second installation position 103, the working environment sensor 2 may be electrically connected to the input portion, such that the working environment sensor 2 may be electrically connected to the data terminal of the information processing apparatus 3 through the input portion. Or the process cartridge 100 may also include the third conductive part. The first end of the third conductive part may be electrically connected to the working environment sensor 2, and the second end of the third conductive part may be electrically connected to the data terminal of the information processing apparatus 3, such that the working environment sensor 2 may be electrically connected to the data terminal of the information processing apparatus 3 through the third conductive part. When the information processing apparatus 3 is installed on the second installation position 103 and when the process cartridge 100 is installed at the preset position on the image-forming apparatus 200, the working environment sensor 2 may be electrically connected to the image-forming apparatus 200 through the data terminal of the information processing apparatus 3.

In other embodiments, the process cartridge 100 may further include the first conductive part. The first end of the first conductive part may be electrically connected to the working environment sensor 2, and the second end of the first conductive part may be configured to be spaced apart from the data terminal of the information processing apparatus 3. When the information processing apparatus 3 is installed on the second installation position 103 and when the process cartridge 100 is installed at the preset position on the image-forming apparatus 200, the second end of the first conductive part and the data terminal of the information processing apparatus 3 may be electrically connected to same contact of the image-forming apparatus 200, such that the working environment sensor 2 may be electrically connected to the image-forming apparatus 200 through the first conductive part. Exemplarily, when the information processing apparatus 3 is installed on the second installation position 103 and when the process cartridge 100 is not installed on the image-forming apparatus 200, the second end of the first conductive part may be spaced apart from and not electrically connected to the data terminal of the information processing apparatus 3. When the information processing apparatus 3 is installed on the second installation position 103 and when the process cartridge 100 is installed at the preset position on the image-forming apparatus 200, the second end of the first conductive part and the data terminal of the information processing apparatus 3 may be still in a spaced-apart state, but the second end of the first conductive part and the data terminal of the information processing apparatus 3 may be both electrically connected to same contact point on the image-forming apparatus 200. Or when the process cartridge 100 is installed at the preset position on the image-forming apparatus 200, the second end of the first conductive part may be in contact with the data terminal of the information processing apparatus 3, thereby realizing electrical connection between the second end of the first conductive part and the data terminal of the information processing apparatus 3. In addition, the data terminal of the information processing apparatus 3 may be electrically connected to the contact of the image-forming apparatus 200, such that the working environment sensor 2 may be electrically connected to the image-forming apparatus 200 through the information processing apparatus 3.

In other embodiments, when the information processing apparatus 3 is installed on the second installation position 103 and when the process cartridge 100 further includes the second conductive part, the first end of the second conductive part may be electrically connected to the working environment sensor 2, and the projection of the second end of the second conductive part may be at least partially overlapped with the projection of the data terminal of the information processing apparatus 3 along the direction perpendicular to the information processing apparatus 3. Moreover, the side surface of the second end of the second conductive part away from the data terminal of the information processing apparatus 3 may be a conductive surface, and the side surface of the second end of the second conductive part adjacent to the data terminal of the information processing apparatus 3 may be an insulating surface, such that the conductive surface may be insulated from the data terminal of the information processing apparatus 3. When the process cartridge 100 is installed at the preset position on the image-forming apparatus 200, the second end of the second conductive part and the data terminal of the information processing apparatus 3 may be in electrical contact with same contact of the image-forming apparatus 200. Exemplarily, the second end of the second conductive part may be in contact with the data terminal of the information processing apparatus 3, but the surface where the second end of the second conductive part is in contact with the data terminal of the information processing apparatus 3 is an insulating surface, such that the second end of the second conductive part may be not electrically connected to the data terminal of the information processing apparatus 3. However, when the process cartridge 100 is installed at the preset position on the image-forming apparatus 200, the second end of the second conductive part and the data terminal of the information processing apparatus 3 may be both electrically connected to same contact of the image-forming apparatus 200.

In one embodiment, the information processing apparatus 3 may be configured at the second installation position 103 of the main body 1, and the working environment sensor 2 may be configured at the outer side of the main body 1. Exemplarily, one of the second installation position 103 and the working environment sensor 2 may be configured on the image-forming assembly, and another one of the second installation position 103 and the working environment sensor 2 may be configured on the developing assembly. The image-forming assembly may include the photosensitive drum, and the developing assembly may include the developing roller. Or the main body 1 may include the developer accommodating cavity and the image-forming assembly; the developer accommodating cavity may be configured to accommodate the developer; the image-forming assembly may include the photosensitive drum; one of the second installation position 103 and the working environment sensor 2 may be configured on the image-forming assembly, and another one of the second installation position 103 and the working environment sensor 2 may be configured on the developer accommodating cavity. Or the main body 1 may include the developer accommodating cavity and the developing assembly; the developer accommodating cavity may be configured to accommodate the developer; the developing assembly may include the developing roller; one of the second installation position 103 and the working environment sensor 2 may be configured on the developing assembly, and another one of the second installation position 103 and the working environment sensor 2 may be configured on the developer accommodating cavity. Or the main body 1 may include the developer accommodating cavity, the developing assembly and the image-forming assembly; the developer accommodating cavity may be configured to accommodate the developer; the image-forming assembly may include the photosensitive drum; the developing assembly may include the developing roller; one of the second installation position 103 and the working environment sensor 2 may be configured on one of the developer accommodating cavity, the developing assembly and the image-forming assembly; and another one of the second installation position 103 and the working environment sensor 2 may be configured on another one of the developer accommodating cavity, the developing assembly and the image-forming assembly. Or the main body 1 may include the developer accommodating cavity configured to accommodate the developer; and the second installation position 103 and the working environment sensor 2 may be configured on the developer accommodating cavity. Or the main body 1 may include the developing assembly; the developing assembly may include the developing roller; and the second installation position 103 and the working environment sensor 2 may be configured on the developing assembly. Or the main body 1 may include the image-forming assembly; the image-forming assembly may include the photosensitive drum; and the second installation position 103 and the working environment sensor 2 may be configured on the image-forming assembly.

It should be noted that, in embodiments of the present disclosure, the second parameter obtained based on the first parameter may be same or different data type as the first parameter. The values of the first parameter and the second parameter may be same or different, and the second parameter may also be calculated and generated based on the first parameter combined with a preset algorithm or associated information, which may not be limited in embodiments of the present disclosure. Exemplarily, the second parameter may be determined based on the first parameter, which may refer to exemplary embodiment six.

Exemplary Embodiment Four

Figure 9:
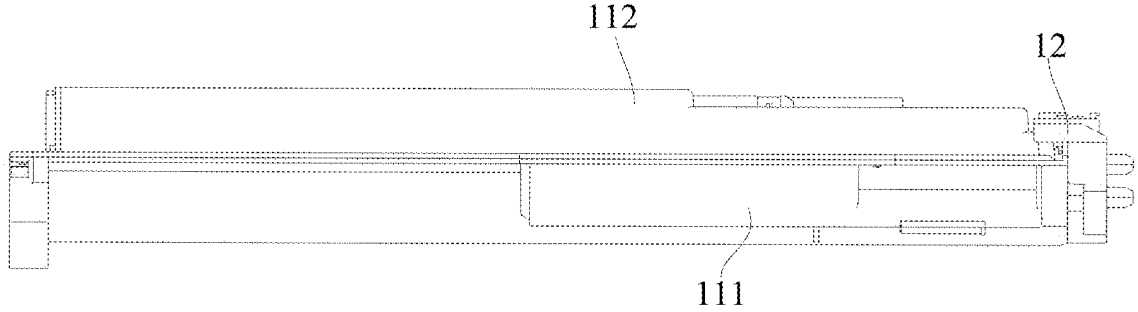
FIG. 9 illustrates a stereoscopic view of a process cartridge provided by exemplary embodiment four of the present disclosure.
Figure 10:
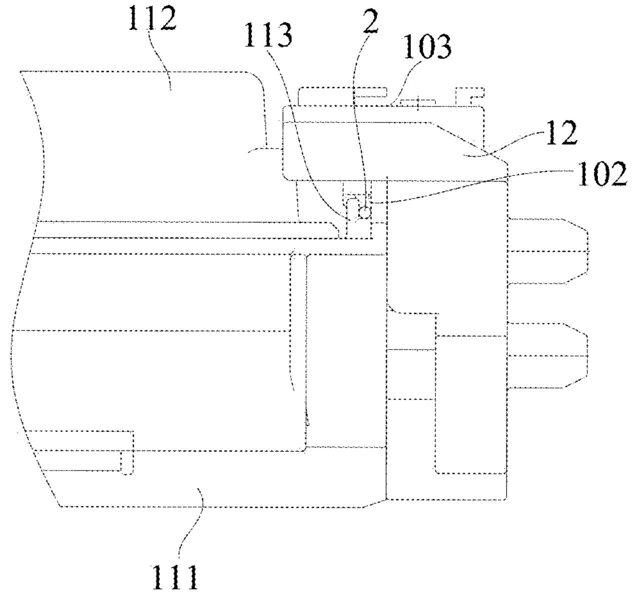
FIG. 10 illustrates a partial enlarged structural schematic of a process cartridge in FIG. 9.

Referring to FIGS. 9-10, based on exemplary embodiment one, embodiments of the present disclosure further provide another process cartridge 100. The main difference between exemplary embodiment four and exemplary embodiment one is that in exemplary embodiment four, the process cartridge 100 may include the main body 1, but may not include the information processing apparatus 3 and the working element. The main body 1 may be configured with the first installation position 102 and the second installation position 103, where the first installation position 102 may be configured to install the working element, and the second installation position 103 may be configured to install the information processing apparatus 3. When the first parameter measured by the working element or the second parameter obtained based on the first parameter does not meet expectation, the process cartridge 100 may stop conveying the developer.

The working element configured as the working environment sensor 2 is described hereinafter. It should be understood that the working element may also be configured as the fixed resistor or the adjustable resistor, or different types of working environment sensors 2 may cooperate with each other, or the working environment sensor 2 may cooperate with the fixed resistor or the adjustable resistor.

In one embodiment, when the working environment sensor 2 is electrically connected to the information processing apparatus 3, the information processing apparatus 3 may be configured with the input portion electrically connected to the data terminal, and the working environment sensor 2 may be electrically connected to the input portion, such that the working environment sensor 2 may be electrically connected to the data terminal of the information processing apparatus 3 through the input portion. Or the process cartridge 100 may also include the third conductive part. The first end of the third conductive part may be configured to be electrically connected to the working environment sensor 2, and the second end of the third conductive part may be configured to be electrically connected to the data terminal of the information processing apparatus 3, such that the working environment sensor 2 may be electrically connected to the data terminal of the information processing apparatus 3 through the third conductive part. When the process cartridge 100 is installed at the preset position on the image-forming apparatus 200, the working environment sensor 2 may be electrically connected to the image-forming apparatus 200 through the data terminal of the information processing apparatus 3.

In some embodiments, the working environment sensor 2 may be installed at the first installation position 102, and the information processing apparatus 3 may be installed at the second installation position 103. When the process cartridge 100 is installed on the image-forming apparatus 200, the communication module and the working environment sensor 2 may be electrically connected to same contact of the image-forming apparatus 200. At this point, same contact of the image-forming apparatus 200 may be configured to communicate with the information processing apparatus 3 and obtain the first parameter measured by the working environment sensor 2, which may reduce the number of contacts on the image-forming apparatus 200 and corresponding circuit settings, simplify the structure, and reduce costs.

In some embodiments, the working environment sensor 2 may be installed at the first installation position 102, and the information processing apparatus 3 may be installed at the second installation position 103. When the process cartridge 100 is installed on the image-forming apparatus 200, the communication module and the working environment sensor 2 may be electrically connected to different contacts on the image-forming apparatus 200. For example, the information processing apparatus 3 may include the transmission terminal different from the data terminal, the working environment sensor 2 may be electrically connected to a contact of the image-forming apparatus 200 through the transmission terminal on the information processing apparatus 3, and the data terminal on the information processing apparatus 3 may be electrically connected to another contact of the image-forming apparatus 200. Or the information processing apparatus 3 may be not configured with the transmission terminal for being electrically connected to the working environment sensor 2. The working environment sensor 2 may be directly and electrically connected to a contact of the image-forming apparatus 200 not through the information processing apparatus 3, and the data terminal on the information processing apparatus 3 may be electrically connected to another contact of the image-forming apparatus 200.

In other embodiments, the working environment sensor 2 may be installed at the first installation position 102, the information processing apparatus 3 may be installed at the second installation position 103, and the process cartridge may further include the first conductive part. The first end of the first conductive part may be configured to be electrically connected to the working environment sensor 2, and the second end of the first conductive part may be configured to be spaced apart from the data terminal of the information processing apparatus 3. When the process cartridge 100 is installed at the preset position on the image-forming apparatus 200, the second end of the first conductive part and the data terminal of the information processing apparatus 3 may be electrically connected to same contact of the image-forming apparatus 200, such that the working environment sensor 2 may be electrically connected to the image-forming apparatus 200 through the first conductive part. Exemplarily, when the process cartridge 100 is not installed on the image-forming apparatus 200, the second end of the first conductive part may be spaced apart from and not electrically connected to the data terminal of the information processing apparatus 3. When the process cartridge 100 is installed at the preset position on the image-forming apparatus 200, the second end of the first conductive part and the data terminal of the information processing apparatus 3 may be still in a spaced-apart state, but the second end of the first conductive part and the data terminal of the information processing apparatus 3 may be both electrically connected to same contact point on the image-forming apparatus 200. When the process cartridge 100 is installed at the preset position on the image-forming apparatus 200, the second end of the first conductive part may be in contact with the data terminal of the information processing apparatus 3, thereby realizing electrical connection between the second end of the first conductive part and the data terminal of the information processing apparatus 3. In addition, the data terminal of the information processing apparatus 3 may be electrically connected to the contact of the image-forming apparatus 200, such that the second conductive part may be electrically connected to the image-forming apparatus 200 through the information processing apparatus 3.

In other embodiments, the working environment sensor 2 may be installed at the first installation position 102, the information processing apparatus 3 may be installed at the second installation position 103, and the process cartridge 100 may further include the second conductive part. The first end of the second conductive part may be configured to be electrically connected to the working environment sensor 2; and the second end of the second conductive part may be configured to be at least partially overlapped with the projection of the data terminal of the information processing apparatus 3 along the direction perpendicular to the information processing apparatus 3. Moreover, the side surface of the second end of the second conductive part away from the data terminal of the information processing apparatus 3 may be a conductive surface, and the side surface of the second end of the second conductive part adjacent to the data terminal of the information processing apparatus 3 may be an insulating surface, such that the conductive surface may be insulated from the data terminal of the information processing apparatus 3. When the process cartridge 100 is installed at the preset position on the image-forming apparatus 200, the second end of the second conductive part and the data terminal of the information processing apparatus 3 may be electrically connected to same contact point on the image-forming apparatus 200. Exemplarily, the second end of the second conductive part may be in contact with the data terminal of the information processing apparatus 3, but the surface where the second end of the second conductive part is in contact with the data terminal of the information processing apparatus 3 may be an insulating surface, such that the second end of the second conductive part may be not electrically connected to the data terminal of the information processing apparatus 3. However, when the process cartridge 100 is installed at the preset position on the image-forming apparatus 200, the second end of the second conductive part and the data terminal of the information processing apparatus 3 may be both electrically connected to same contact of the image-forming apparatus 200.

In one embodiment, the main body 1 may be configured with the first installation position 102 and the second installation position 103. Exemplarily, one of the first installation position 102 and the second installation position 103 may be configured on the image-forming assembly, and another one of the first installation position 102 and the second installation position 103 may be configured on the developing assembly. The image-forming assembly may include the photosensitive drum, and the developing assembly may include the developing roller. Or the main body 1 may include the developer accommodating cavity and the image-forming assembly; the developer accommodating cavity may be configured to accommodate the developer; the image-forming assembly may include the photosensitive drum; one of the first installation position 102 and the second installation position 103 may be configured on the image-forming assembly; and another one of the first installation position 102 and the second installation position 103 may be configured on the developer accommodating cavity. Or the main body 1 may include the developer accommodating cavity and the developing assembly; the developer accommodating cavity may be configured to accommodate the developer; the developing assembly may include the developing roller; one of the first installation position 102 and the second installation position 103 may be configured on the developing assembly, and another one of the first installation position 102 and the second installation position 103 may be configured on the developer accommodating cavity. Or the main body 1 may include the developer accommodating cavity, the developing assembly and the image-forming assembly; the developer accommodating cavity may be configured to accommodate the developer; the image-forming assembly may include the photosensitive drum, the developing assembly may include the developing roller; one of the first installation position 102 and the second installation position 103 may be configured on one of the developer accommodating cavity, the developing assembly and the image-forming assembly; and another one of the first installation position 102 and the second installation position 103 may be configured on another one of the developer accommodating cavity, the developing assembly and the image-forming assembly. Or the main body 1 may include the developer accommodating cavity configured to accommodate the developer; and the first installation position 102 and the second installation position 103 may be configured on the developer accommodating cavity. Or the main body 1 may include the developing assembly; the developing assembly may include the developing roller; and the first installation position 102 and the second installation position 103 may be configured on the developing assembly. Or the main body 1 may include the image-forming assembly; the image-forming assembly may include the photosensitive drum; and the first installation position 102 and the second installation position 103 may be configured on the image-forming assembly.

The structures of the information processing apparatus 3 and the working environment sensor 2 may be same as those structures of the information processing apparatus 3 and the working environment sensor 2 described in exemplary embodiment one, which may not be described in detail herein.

Accordingly, embodiments of the present disclosure further provide a process cartridge set. The process cartridge set may include the working environment sensor 2 and the process cartridge 100 as in exemplary embodiment two. The working environment sensor 2 may be installed at the first installation position 102 of the process cartridge 100 and electrically connected to the information processing apparatus 3 of the process cartridge 100. When the first parameter or the second parameter obtained based on the first parameter does not meet expectation, the process cartridge 100 may stop conveying the developer. Or the process cartridge set may include the information processing apparatus 3 and the process cartridge 100 as in exemplary embodiment three, the information processing apparatus 3 may be installed at the second installation position 103 of the process cartridge 100. When the first parameter or the second parameter obtained based on the first parameter does not meet expectation, the process cartridge 100 may stop conveying the developer. The information processing apparatus 3 may be the information processing apparatus 3 described in exemplary embodiment one, and corresponding structure and working mode may be same as those in exemplary embodiment one, which may be not described in detail herein. Or the process cartridge set may include the working environment sensor 2, the information processing apparatus 3 and the process cartridge 100 as in exemplary embodiment four. The working environment sensor 2 may be installed at the first installation position 102, and the information processing apparatus 3 may be installed at the second installation position 103. When the first parameter or the second parameter obtained based on the first parameter does not meet expectation, the process cartridge 100 may stop conveying the developer.

Accordingly, embodiments of the present disclosure further provide an adaptation assembly used to be configured in the process cartridge 100. For example, the adaptation assembly may include the working environment sensor 2 and the information processing apparatus 3. The working environment sensor 2 may be used to be configured in the main body 1 of the process cartridge 100 to detect the first parameter related to the process cartridge 100; and the image-forming apparatus 200 may obtain the first parameter. The working environment sensor 2 and the information processing apparatus 3 may be the working environment sensor 2 and the information processing apparatus 3 described in exemplary embodiment one; and corresponding structure, installation manner and connection manner may be substantially same as those in exemplary embodiment one, which may not be described in detail herein.

It should be noted that, in embodiments of the present disclosure, the second parameter obtained based on the first parameter may be same or different data type as the first parameter. The values of the first parameter and the second parameter may be same or different, and the second parameter may also be calculated and generated based on the first parameter combined with a preset algorithm or associated information, which may not be limited in embodiments of the present disclosure. Exemplarily, the second parameter may be determined based on the first parameter, which may refer to exemplary embodiment six.

Exemplary Embodiment Five

The image-forming operation needs to be performed in a suitable environment. If the environmental parameters do not meet expectation (for example, the temperature of the process cartridge is too high or the humidity is too high), the developer may clump, and the developer conveying may be not smooth. In addition, if the temperature and humidity inside the image-forming apparatus 200 are too high or low, the image-forming effect may be affected. The environmental parameters may be detected to ensure the accuracy of the detection. However, the working environment sensor 2 configured to detect environmental parameters may have errors or be damaged, or although the working environment sensor 2 works normally, the image-forming apparatus 200 configured with the working environment sensor 2 may have problems, which may lead to mis-determination and affect normal progress of the image-forming operation.

To solve above-mentioned problems, embodiments of the present disclosure provides that when the difference between internal environment parameter measured by the internal environment sensor in the image-forming apparatus 200 and the first parameter measured by the working environment sensor 2 or the second parameter obtained based on the first parameter is not within the preset value range, determination of whether the first parameter or the second parameter obtained based on the first parameter meets the expectation may be stopped. The measurement of the working environment sensor 2 may be calibrated by the internal environment sensor in the image-forming apparatus 200. When the difference between above-mentioned two parameters is too large, it determines that the working environment sensor 2 may have problems, or the environment in the image-forming apparatus 200 may have problems. The image-forming apparatus 200 may stop determining whether the first parameter or the second parameter obtained based on the first parameter meets the expectation, which may prevent mis-determination.

Furthermore, when the difference between internal environment parameter measured by the internal environment sensor in the image-forming apparatus 200 and the first parameter measured by the working environment sensor 2 or the second parameter obtained based on the first parameter is not within the preset value range, determination of whether the first parameter or the second parameter obtained based on the first parameter meets the expectation may be stopped, and the process cartridge may stop conveying the developer.

Furthermore, the detection method may further include the following exemplary steps.

When the internal environmental parameter measured by the internal environmental sensor in the image-forming apparatus 200 in multiple tests increases gradually, if the first parameter measured by the working environment sensor 2 in multiple tests in same time period or the second parameter obtained based on the first parameter does not increase accordingly, the image-forming apparatus 200 may stop determining whether the first parameter or the second parameter meets expectation; or when the internal environmental parameter measured by the internal environmental sensor in the image-forming apparatus 200 in multiple tests decreases gradually, if the first parameter measured by the working environment sensor 2 in multiple tests in same time period or the second parameter obtained based on the first parameter does not decrease accordingly, the image-forming apparatus 200 may stop determining whether the first parameter or the second parameter meets expectation.

When the environmental parameters in the image-forming apparatus 200 change, the environmental parameters of the process cartridge 100 may also change accordingly. Therefore, if the environmental parameters of the process cartridge 100 do not change with the internal environmental parameters measured by the internal environmental sensor, it may be that the internal environmental sensor or the working environment sensor 2 may be abnormal. Therefore, determination of whether the first parameter or the second parameter meets the expectation may be stopped to prevent mis-determination.

Optionally, the internal environment sensor may be an environmental parameter (such as temperature, humidity or the like) sensor. Furthermore, the internal environment sensor may be a thermistor, a thermocouple or the like.

Optionally, when the internal environment parameter measured by the internal environment sensor in the image-forming apparatus 200 in multiple tests increases gradually, it may at least include the following scenarios.

Among all the test results in above-mentioned multiple tests, at least two test results may be equal to each other, but remaining test results may gradually increase; or

- among all the test results in above-mentioned multiple tests, a later test result may be always greater than a previous test result; or
- among all the test results in above-mentioned multiple tests, there may be two adjacent test results, where a later test result may be less than a previous test result, but the difference between two test results may be within a test error range; and at least one later test result in the multiple tests may be greater than at least one previous test results; or
- the multiple detection results may be segmented in sequence according to the detection time, and the average values of the detection results in different segments may be calculated; and the average value in the segment of a later detection time may be greater than the average value in the segment of a previous detection time.

Optionally, when the internal environment parameter measured by the internal environment sensor in the image-forming apparatus 200 in multiple tests decreases gradually, it may at least include the following scenarios.

Among all the test results in above-mentioned multiple tests, at least two test results may be equal to each other, but remaining test results may gradually decrease; or

- among all the test results in above-mentioned multiple tests, a later test result may be always less than a previous test result; or among all the test results in above-mentioned multiple tests, there may be two adjacent test results, where a later test result may be greater than a previous test result, but the difference between two test results may be within the test error range; and at least one later test result in the multiple tests may be less than at least one previous test result; or multiple detection results may be segmented in sequence according to the detection time, and the average values of the detection results in different segments may be calculate; and the average value in the segment of a later detection time may be less than the average value in the segment of a previous detection time.

It may be understood that the method in exemplary embodiment five may be applied to above-mentioned exemplary embodiments one to four, and the method in exemplary embodiment five may be implemented before the method in exemplary embodiment one.

Exemplary Embodiment Six

During the image-forming operation, the image-forming apparatus 200 may need to collect or output electrical signals to realize information interaction between the process cartridge 100 and the main body of the image-forming apparatus 200. However, during the obtaining or transmission process, the electrical signals may be inaccurate or unreliable due to circuit or assembly damage, poor contact, low precision and the like, which may affect information interaction.

The present disclosure provides a process cartridge for detachably installed on the image-forming apparatus. The process cartridge may include the main body 1, the working element and the information processing apparatus 3. The working element may be configured on the main body 1 and configured to detect or obtain the first parameter related to the process cartridge 100. The image-forming apparatus 200 may obtain the first parameter. The information processing apparatus 3 may be configured on the main body 1 and configured to transmit the correction coefficient to the image-forming apparatus 200. The correction coefficient may be configured to correct the first parameter to obtain the second parameter. That is, by using the correction coefficient to correct the first parameter, the first parameter affected by signal interference, poor contact, low precision and other reasons may be corrected to improve the accuracy of signal obtaining or transmission.

Optionally, the working element may be working environment sensor 2 configured to detect the first parameter related to the process cartridge 100, and the image-forming apparatus 200 may obtain the first parameter; or the working element may be the fixed resistor and configured to enable the image-forming apparatus 200 to obtain the first parameter; or the working element may be the adjustable resistor and configured to enable the image-forming apparatus 200 to obtain the first parameter.

When the working element is the working environment sensor 2, the image-forming apparatus 200 may obtain environmental information of the process cartridge 100, such as temperature, humidity, light intensity and the like, through the working environment sensor 2, but obtained environmental information may have errors, which may affect the determination of the image-forming apparatus 2 and lead to mis-determination. When the working element is the fixed resistor or the adjustable resistor, the image-forming apparatus 200 may obtain electrical signals such as current and voltage of the process cartridge 100 through the fixed resistor or the adjustable resistor. The electrical signal may also be deviated, which may affect the determination of the image-forming apparatus 2 and lead to mis-determination.

The working element configured as the working environment sensor 2 is described hereinafter. It should be understood that the working element may also be configured as the fixed resistor or the adjustable resistor, or different types of working environment sensors 2 may cooperate with each other, or the working environment sensor 2 may cooperate with the fixed resistor or the adjustable resistor.

When the image-forming operation is performed, it is necessary to use the working environment sensor 2 to detect the working environment of the process cartridge. If the detection accuracy of the working environment sensor 2 is low, it may lead to large detection errors for the environmental parameter. If the detection accuracy of the working environment sensor 2 is too high, it may lead to increased costs. For example, the temperature inside the image-forming apparatus 200 may be measured by a thermistor; and a cooling manner may be performed when the temperature is too high to avoid a series of problems caused by the temperature rise inside the image-forming apparatus 200. However, the temperature measurement accuracy of the thermistor may be not high with certain errors. The image-forming apparatus 200 may not accurately detect the temperature and turn on cooling in time, which may result in different print numbers for each machine or cause clumping by exceeding the preset temperature, thereby affecting normal operation of the image-forming apparatus 200. However, the use of high-precision thermistors may lead to increased costs, thereby resulting in excessively high use costs.

In order to solve above-mentioned problems, embodiments of the present disclosure provide a process cartridge for detachably installed on the image-forming apparatus 200. The process cartridge may include the main body 1, the working environment sensor 2 and the information processing apparatus 3. The working environment sensor 2 may be configured on the main body 1 and configured to detect or obtain the first parameter related to the process cartridge 200. The information processing apparatus 3 may be configured on the main body 1 and configured to transmit the correction coefficient to the image-forming apparatus 200. The correction coefficient may be configured to correct the first parameter measured by the working environment sensor 2 to obtain the second parameter. When the environmental parameters of the process cartridge is detected, the image-forming apparatus 200 may correct the first parameter measured by the working environment sensor 2 based on the correction coefficient to obtain the second parameter. In the present disclosure, the detection accuracy may be improved by correcting the first parameter.

The description related to above-mentioned first parameter may be same as that in exemplary embodiment one, which may not be described in detail herein.

Furthermore, another embodiment of the present disclosure further provides a process cartridge 100 for detachably installed on the image-forming apparatus 200. The process cartridge 100 may include the main body 1 and the information processing apparatus 3. The main body may be configured with the first installation position; and the first installation position may be used to install the working element. The information processing apparatus 3 may be configured on the main body 1 and configured to transmit the correction coefficient to the image-forming apparatus 200.

When the working element is installed at the first installation position, the working element may be configured to detect or obtain the first parameter related to the process cartridge 100. The image-forming apparatus 200 may obtain the first parameter, and the correction coefficient may be configured to correct the first parameter to obtain the second parameter.

Based on above-mentioned process cartridge, another embodiment of the present disclosure further provides a process cartridge set for detachably installed on the image-forming apparatus 200. The process cartridge set may include the working element and the process cartridge 100 as described above; and the working element may be installed at the first installation position.

Another embodiment of the present disclosure further provides a process cartridge 100 configured to be detachably installed on the image-forming apparatus 200. The process cartridge 100 may include the main body 1 and the working element. The main body 1 may be configured with the second installation position, and the second installation position may be configured to install the information processing apparatus 3. The working element may be configured on the main body 1 and configured to detect or obtain the first parameter related to the process cartridge 100; and the image-forming apparatus 200 may obtain the first parameter. When the information processing apparatus 3 is installed at the second installation position, the information processing apparatus 3 may be configured to transmit the correction coefficient to the image-forming apparatus 200, and the correction coefficient may be configured to correct the first parameter measured by the working element to obtain the second parameter.

Based on above-mentioned process cartridge, another embodiment of the present disclosure further provides a process cartridge set for detachably installed on the image-forming apparatus 200. The process cartridge set may include the information processing apparatus 3 and the process cartridge 100 as described above. The information processing apparatus 3 may be installed at the second installation position and electrically connected to the working element. The information processing apparatus 3 may be configured to transmit the correction coefficient to the image-forming apparatus 200. The correction coefficient may be configured to correct the first parameter measured by the working element provided in the main body to obtain the second parameter.

In above-mentioned embodiment, the first installation position and the second installation position may be positions same as or different from the first installation position and the second installation position in exemplary embodiment two, exemplary embodiment three and exemplary embodiment four.

Another embodiment of the present disclosure further provides the information processing apparatus 3 including a communication module and a processing module. The communication module may be configured to communicate with the image-forming apparatus 200. The processing module may be configured to output the correction coefficient to the image-forming apparatus 200 through the communication module when a preset event occurs. The correction coefficient may be configured to correct the first parameter obtained by the image-forming apparatus 200 to obtain the second parameter. When the information processing apparatus 3 is installed on the process cartridge and when the process cartridge 100 is installed on the image-forming apparatus 200, the processing module of the information processing apparatus 3 may transmit the correction coefficient to the image-forming apparatus 200 through the communication module when the preset event occurs, such that the image-forming apparatus 200 may correct the first parameter based on the correction coefficient to obtain the second parameter. Obviously, above-mentioned information processing apparatus 3 and the information processing apparatus 3 mentioned in previous embodiment may be same or different.

Optionally, the preset event may include the communication module receiving a request for obtaining the correction coefficient sent by the image-forming apparatus 200; or the preset event may include the interaction between the information processing apparatus and the image-forming apparatus 200 reaching a preset stage; or the preset event may include the process cartridge 100 entering a preset state.

Optionally, when the communication module receives the request for obtaining the correction coefficient sent by the image-forming apparatus 200, or when the interaction between the information processing apparatus 3 and the image-forming apparatus 200 reaches a preset stage, or when the process cartridge 100 enters a preset state, that is, when the preset event occurs, the processing module may output the correction coefficient to the image-forming apparatus 200 through the communication module at a preset frequency.

The interaction between the information processing apparatus 3 and the image-forming apparatus 200 may reach a preset stage. For example, when the cover of the image-forming apparatus 200 is closed, the information processing apparatus 3 and the image-forming apparatus 200 may start information interaction; and when the interaction starts and a certain period of time has passed, it determines that the preset stage is entered. Or when the interaction between the information processing apparatus 3 and the image-forming apparatus 200 reaches a precondition, it determines that above-mentioned preset state is entered.

Above-mentioned process cartridge 100 may enter the preset state; for example, the number of pages printed by the process cartridge 100 may reach a preset value; or the parameter detected by the environmental sensor on the process cartridge 100 may reach a preset value. That is, it determines that above-mentioned preset stage is entered.

Based on above-mentioned information processing apparatus, the present disclosure further provides an adaptation assembly for being configured in the process cartridge 100. The adaptation assembly may include the working element and the information processing apparatus 3. The working element may be configured to be configured on the main body of the process cartridge 100 and configured to detect or obtain the first parameter related to the process cartridge 100. The image-forming apparatus 200 may obtain the first parameter.

Optionally, the first parameter may be compared with the first preset parameter range. If the first parameter is not within the first preset parameter range, expectation may be not met. It should be understood that the second parameter may also be compared with the second preset parameter range. If the second parameter is not within the second preset parameter range, expectation may be not met. The first preset parameter range and the second preset parameter range may be same, different or partially overlapped with each other.

Optionally, the information processing apparatus 3 may include a storage module. The storage module may be configured to store the correction coefficient; or the storage module may be configured to store the associated information, and the associated information may be configured to calculate the correction coefficient; or the storage module may be configured to store the preset algorithm, and the preset algorithm may be configured to calculate the correction coefficient.

When the storage module stores associated information, the information processing apparatus 3 may further include the first calculation module for calculating the correction coefficient based on the associated information.

Or when the storage module stores the preset algorithm, the information processing apparatus 3 may further include the second calculation module for calculating the correction coefficient based on the preset algorithm. The correction coefficient may be not directly stored in the information processing apparatus 3, but the correction coefficient may be obtained through the associated information and/or the preset algorithm; and the correction coefficient may be transmitted to the image-forming apparatus 200 for obtaining the second parameter.

Optionally, the information processing apparatus 3 may be also configured to obtain the correction coefficient externally; or the information processing apparatus 3 may be also configured to obtain the associated information for calculating the correction coefficient externally; or the information processing apparatus 3 may be also configured to externally obtain the preset algorithm for calculating the correction coefficient.

When the information processing apparatus 3 obtains the associated information externally, the information processing apparatus 3 may also include the first calculation module for calculating the correction coefficient based on the associated information. When the information processing apparatus 3 obtains the preset algorithm externally, the information processing apparatus 3 may also include the second calculation module for calculating the correction coefficient based on the preset algorithm. The information processing apparatus 3 may not directly store the correction coefficient, the associated information and the preset algorithm, but obtain the associated information or the preset algorithm externally, obtain the correction coefficient based on the associated information and/or the preset algorithm, and transmit the correction coefficient to the image-forming apparatus 200 for obtaining the second parameter.

Exemplarily, the correction coefficient, associated information and the preset algorithm may be inputted into the information processing apparatus 3 before leaving the factory, or the information processing apparatus 3 may obtain the correction coefficient, associated information and the preset algorithm externally by a reading manner after leaving the factory.

When the information processing apparatus 3 includes only chips, based on the number of chips, the storage module and the communication module may be located on same chip or different chips respectively.

Exemplarily, for the first manner, when the number of chips is at least two, the chip with the communication module may be a transmission chip, and the chip without the communication module may be a proxy chip. At least one chip may be the transmission chip, and at least another chip may be the proxy chip. At least one of the storage module, the first calculation module, or the second calculation module may be on the proxy chip. It may be understood that when there are at least two proxy chips, above-mentioned modules may be on same proxy chip or different proxy chips. Based on above-mentioned scenarios, it may include at least the following embodiments.

The image-forming apparatus 200 may obtain the correction coefficient through the communication module and need to transmit the correction coefficient stored in the proxy chip to the transmission chip through the proxy chip, such that the transmission chip may directly transmit the correction coefficient to the image-forming apparatus 200. For example, the information processing apparatus may include the storage module and the communication module, the communication module may be configured on the transmission chip, and the storage module may be configured on the proxy chip. The storage module may store the correction coefficient, and the proxy chip may transmit the correction coefficient stored in the storage module to the transmission chip and transmit the correction coefficient to the image-forming apparatus 200 through the communication module of the transmission chip.

Or the proxy chip may not directly store the correction coefficient but transmit the calculated correction coefficient to the transmission chip, and then the transmission chip may transmit the correction coefficient to the image-forming apparatus 200, which may at least include the following two cases. 1) The information processing apparatus may include the storage module, the first calculation module and the communication module; the communication module may be configured on the transmission chip; and the storage module and the first calculation module may be configured on the proxy chip. The storage module may store association information that may be configured to calculate the correction coefficient. The first calculation module may calculate the correction coefficient based on associated information in the storage module, and the proxy chip may transmit calculated correction coefficient to the transmission chip and transmit the correction coefficient to the image-forming apparatus 200 through the communication module of the transmission chip. The first calculation module may directly calculate the correction coefficient based on the associated information, or indirectly calculate the correction coefficient by obtaining a matching algorithm and matching the algorithm with the associated information. 2) The information processing apparatus may include the storage module, the second calculation module and the communication module; the communication module may be configured on the transmission chip; and the storage module and the second calculation module may be configured on the proxy chip. The storage module may store a preset algorithm configured to calculate the correction coefficient. The second calculation module may calculate the correction coefficient based on the preset algorithm in the storage module. The proxy chip may transmit the calculated correction coefficient to the transmission chip and transmits the correction coefficient to the image-forming apparatus 200 through the communication module of the transmission chip. The first calculation module may directly calculate the correction coefficient based on the preset algorithm, or indirectly calculate the correction coefficient by obtaining the matching information and matching the information with the preset algorithm.

Or the proxy chip may transmit stored association information or preset algorithm to the transmission chip, such that the transmission chip may calculate the correction coefficient, and then the transmission chip may transmit the correction coefficient to the image-forming apparatus 200, which may at least include the following two cases. 1) The information processing apparatus may include the storage module, the first calculation module and the communication module; the storage module may be configured on the proxy chip and store associated information; and the first calculation module and the communication module may be configured on the transmission chip. The proxy chip may transmit the associated information stored in the storage module to the transmission chip. After the transmission chip obtains the associated information, the first calculation module may calculate the correction coefficient based on the associated information, and then transmit the correction coefficient to the image-forming apparatus 200 through the communication module. The first calculation module may directly calculate the correction coefficient based on the associated information, or indirectly calculate the correction coefficient by obtaining the matching algorithm and matching the algorithm with the associated information. 2) The information processing apparatus may include the storage module, the second calculation module and the communication module; the storage module may be configured on the proxy chip; the storage module may store the preset algorithm; and the second calculation module and the communication module may be configured on the transmission chip. The proxy chip may transmit the preset algorithm stored in the storage module to the transmission chip. After the transmission chip obtains the preset algorithm, the second calculation module may calculate the correction coefficient based on the preset algorithm, and then transmit the correction coefficient to the image-forming apparatus 200 through the communication module. The second calculation module may directly calculate the correction coefficient based on the preset algorithm, or indirectly calculate the correction coefficient by obtaining the matching information and matching the information with the preset algorithm.

Or the transmission chip may transmit the associated information or the preset algorithm stored therein to the proxy chip; and the proxy chip may calculate the correction coefficient. The proxy chip may then transmit the correction coefficient to the transmission chip, and the communication module of the transmission chip may transmit the correction coefficient to the image-forming apparatus 200. At this point, the communication module and the storage module may be on the transmission chip, and the first calculation module or the second calculation module may be on the proxy chip.

For the second manner, the information processing apparatus 3 may include at least two chips, two chips may be transmission chips, and the transmission chips may include communication modules. The communication module of one transmission chip may be configured to receive a correction coefficient obtaining instruction sent by the image-forming apparatus 200; and the communication module of the other transmission chip may be configured to output the correction coefficient to the image-forming apparatus 200.

For the third manner, the information processing apparatus 3 may include at least two chips, where the two chips may be respectively the first transmission chip and the second transmission chip; the first transmission chip and the second transmission chip may both have the communication modules; and the first transmission chip or the second transmission chip may include the storage module. The communication modules of the first transmission chip and the second transmission chip may receive the correction coefficient obtaining instruction sent by the image-forming apparatus 200. The correction coefficient obtaining instruction received by the first transmission chip cannot be configured to obtain the correction coefficient. Exemplarily, at this point, the correction coefficient obtaining instruction may include the first transmission chip identifier which may be address information; the first transmission chip may not respond to the correction coefficient obtaining instruction with the first transmission chip identifier; after receiving the correction coefficient obtaining instruction, the second transmission chip may respond and control the storage module of the first transmission chip to output the correction coefficient or the storage module of the second transmission chip to output the correction coefficient; and the correction coefficient may be outputted to the image-forming apparatus 200 through the communication module of the second transmission chip or the first transmission chip.

Similarly, when the information processing apparatus 3 includes an external circuit in addition to the chips, the storage module, the communication module, the first calculation module, and the second calculation module mentioned above may be on the chips or the external circuit, respectively. For example, at least one of the communication module, the storage module, the first calculation module and the second calculation module may be configured on the chip; and at least another one of the communication module, the storage module, the first calculation module and the second calculation module may be on the external circuit. It may be understood that the chip and the external circuit may be one or at least two. If there are at least two external circuits, at least two external circuits may be insulated from each other and electrically connected to the chip or the image-forming apparatus 200 respectively. If there are at least two chips, the relationship between different chips may refer to the case when the information processing apparatus 3 only includes chips.

In above-mentioned cases (scenarios), the image-forming apparatus 200 may obtain the correction coefficient through the communication module and need to transmit the stored correction coefficient to the chip through the external circuit, such that the chip may directly transmit the correction coefficient to the image-forming apparatus 200. For example, the information processing apparatus may include the storage module and the communication module; the communication module may be configured on the chip; the storage module may be configured on the external circuit; and the storage module may store the correction coefficient. The external circuit may transmit the correction coefficient stored in the storage module to the chip and transmit the correction coefficient to the image-forming apparatus 200 through the communication module of the chip.

Or the external circuit may not directly store the correction coefficient but transmit the calculated correction coefficient to the chip, and then the chip may transmit the correction coefficient to the image-forming apparatus 200, which may at least include the following two cases. 1) The information processing apparatus may include the storage module, the first calculation module and the communication module; the communication module may be configured on the chip; and the storage module and the first calculation module may be configured on the external circuit. The storage module may store associated information configured to calculate the correction coefficient; the first calculation module may calculate the correction coefficient based on the associated information in the storage module; and the external circuit may transmit the calculated correction coefficient to the chip and transmit the correction coefficient to the image-forming apparatus 200 through the communication module of the chip. The first calculation module may directly calculate the correction coefficient based on the associated information, or indirectly calculate the correction coefficient by obtaining the matching algorithm and matching the algorithm with the associated information. 2) The information processing apparatus may include the storage module, the second calculation module and the communication module; the communication module may be configured on the chip; and the storage module and the second calculation module may be configured on the external circuit. The storage module may store the preset algorithm configured to calculate the correction coefficient. The second calculation module may calculate the correction coefficient based on the preset algorithm in the storage module. The external circuit may transmit the calculated correction coefficient to the chip and transmit the correction coefficient to the image-forming apparatus 200 through the communication module of the chip. The first calculation module may directly calculate the correction coefficient based on the preset algorithm, or indirectly calculate the correction coefficient by obtaining the matching information and matching the information with the preset algorithm.

Or the external circuit may transmit stored association information or the preset algorithm to the chip, such that the chip may calculate the correction coefficient, and then the chip may transmit the correction coefficient to the image-forming apparatus 200, which may at least includes the following two cases. 1) The information processing apparatus may include the storage module, the first calculation module and the communication module; the storage module may be configured on the external circuit and store associated information; and the first calculation module and the communication module may be configured on the chip. The external circuit may transmit the associated information stored in the storage module to the chip. After the chip obtains the associated information, the first calculation module may calculate the correction coefficient based on the associated information, and then transmit the correction coefficient to the image-forming apparatus 200 through the communication module. The first calculation module may directly calculate the correction coefficient based on the associated information, or indirectly calculate the correction coefficient by obtaining the matching algorithm and matching the algorithm with the associated information. 2) The information processing apparatus may include the storage module, the second calculation module and the communication module; the storage module may be configured on the external circuit; the preset algorithm may be stored in the storage module; and the second calculation module and the communication module may be configured on the chip. The external circuit may transmit the preset algorithm stored in the storage module to the chip. After the chip obtains the preset algorithm, the second calculation module may calculate the correction coefficient based on the preset algorithm, and then transmit the correction coefficient to the image-forming apparatus 200 through the communication module. The second calculation module may directly calculate the correction coefficient based on the preset algorithm, or indirectly calculate the correction coefficient by obtaining the matching information and matching the information with the preset algorithm.

Or the communication module may be configured on the external circuit, and the chip may transmit the correction coefficient stored or calculated to the external circuit and transmit the correction coefficient to the image-forming apparatus 200 through the communication module of the external circuit.

Or the storage module may be configured on the chip; the storage module may store associated information or the preset algorithm; and the communication module and the first calculation module or the second calculation module may be configured on the external circuit. The chip may transmit the associated information or the preset algorithm stored to the external circuit, and the external circuit may obtain the correction coefficient by calculating the associated information or the preset algorithm and transmit the correction coefficient to the image-forming apparatus 200 through the communication module.

Or the external circuit may be configured with the communication module and the storage module; the storage module may store associated information or the preset algorithm; and the chip may be configured with the first calculation module or the second calculation module. The storage module of the external circuit may transmit the associated information or the preset algorithm to the chip. In addition, the chip may calculate the associated information or the preset algorithm to obtain the correction coefficient and transmit the correction coefficient to the external circuit; and the communication module of the external circuit may transmit the correction coefficient to the image-forming apparatus 200.

Obviously, the correction coefficient, the associated information or the preset algorithm may not be stored in the chip or external circuit, or the storage module may not be configured; and the chip or external circuit may obtain the correction coefficient, the associated information or the preset algorithm through external access.

Furthermore, the processing module may be on the chip or the external circuit.

It may be understood that the method in exemplary embodiment six may be applied to above-mentioned exemplary embodiments one to four; and at least two of the method in exemplary embodiment six, the method in exemplary embodiment five, and the method in exemplary embodiment one may be used together. The methods in exemplary embodiment six and exemplary embodiment five may be implemented before the method in exemplary embodiment one.

Exemplary Embodiment Seven

Figure 11:
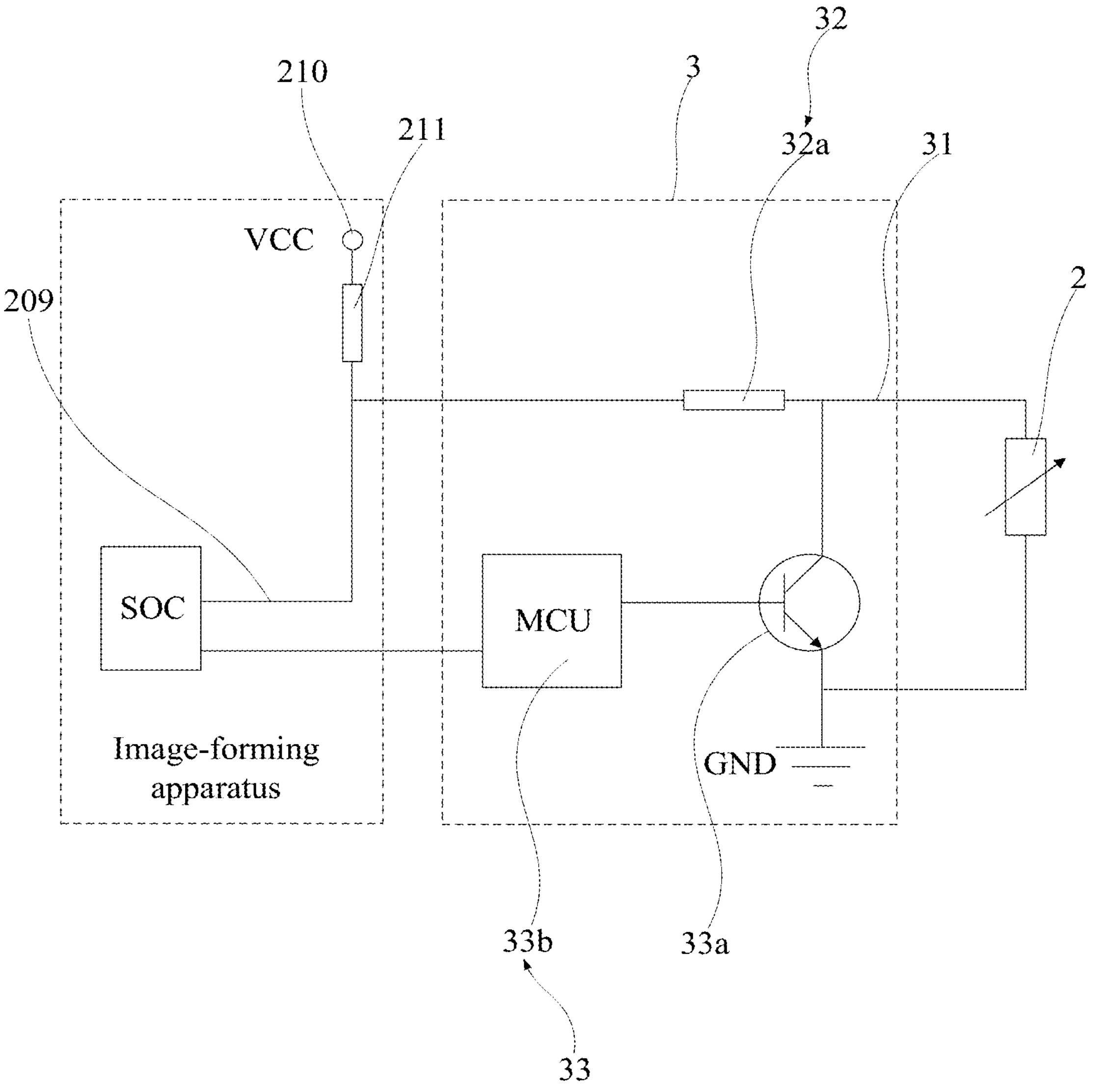
FIG. 11 illustrates a cooperation schematic of an image-forming apparatus and an information processing apparatus provided by exemplary embodiment seven of the present disclosure.

As shown in FIG. 11, based on above-mentioned embodiments, embodiments of the present disclosure further provides a detection circuit for being installed on the process cartridge 100; and the process cartridge 100 may be configured to be detachably installed on the image-forming apparatus 200.

The detection circuit may include a detection unit 31, configured to output the first parameter related to the process cartridge 100; an information feedback unit 32, configured to be electrically connected to the detection unit 31 and provide the image-forming apparatus 200 with feedback information according to connection state with the detection unit 31, where the connection state between the detection unit 31 and the information feedback unit 32 may include the first state and the second state; and further include a control unit 33, configured to control the connection state between the detection unit 31 and the information feedback unit 32 to switch between the first state and the second state according to the switching information outputted by the image-forming apparatus 200. In the first state, the feedback information may be related to the first parameter, and the image-forming apparatus 200 may obtain the first parameter based on the feedback information; and in the second state, the feedback information may be independent of the first parameter.

Compared with the existing technology, the control unit 33 may control the state switching between the detection unit 31 and the information feedback unit 32, such that the electrical connection between the information feedback unit 32 and the detection unit 31 may be switched between the first state and the second state; and the feedback information may change from being related to the first parameter to being unrelated to the first parameter. Based on the change of feedback information, the information feedback unit 32 may be detected, and the detection result may be configured to determine whether the information feedback unit 32 meets expectation. If the information feedback unit meets expectation, the image-forming apparatus 200 may obtain the first parameter accurately. If the information feedback unit does not meet expectation, the process of the image-forming apparatus 200 obtaining the first parameter may be affected by the information feedback unit 32 to have deviation, such that the reliability of information transmission may be detected.

Optionally, the feedback information may be different in the first state and the second state.

Optionally, when the feedback information is related to the first parameter, the feedback information may be configured to measure or obtain the first parameter.

When the feedback information is not related to the first parameter, the feedback information cannot be configured to measure or obtain the first parameter.

Corresponding description of above-mentioned first parameter may be same as description in exemplary embodiment one, which may not be described in detail herein.

Optionally, in the first state, the detection unit 31 may be electrically connected to the information feedback unit 32; and in the second state, the detection unit 31 may be electrically disconnected from the information feedback unit 32; or the detection unit 31 may be short-circuited; or the port corresponding to one end of the detection unit 31 electrically connected to the information feedback unit 32 may be configured to be in a high impedance state.

For example, during laser printing process, heating or friction may cause the temperature of the process cartridge 100 to rise, and the developer stored in the process cartridge 100 may be affected by environmental parameters, such as temperature. If the environmental parameters of the process cartridge 100 are too high or low, the developer stored in the process cartridge 100 may clump, which may affect the developer delivery and printing effect. Therefore, it needs to monitor the environmental parameters (such as temperature) of the process cartridge 100. However, if the circuit or element configured to detect the environmental parameters fails, the detection result may be deviated to affect normal printing.

Therefore, a detection circuit may be utilized for being installed on the process cartridge 100; and the process cartridge 100 may be configured to be detachably installed on the image-forming apparatus 200.

The detection circuit may include the detection unit 31, where one end of the detection unit 31 may be configured to be electrically connected to the working element, and another end of the detection unit 31 may be configured to be electrically connected to the information feedback unit 32, and may be connected to the image-forming apparatus 200 through the information feedback unit 32; and further include the control unit 33, configured to receive information from the image-forming apparatus 200 and control the detection unit 31 and the information feedback unit 32 to have the first state and the second state.

In the first state, the information feedback unit 32 may be connected to the first circuit unit, the first circuit unit may include the detection unit 31, and the detection unit 31 may be electrically connected to the information feedback unit 32; and in the second state, the information feedback unit 32 may be connected to the second circuit unit, where the first circuit unit may be different from the second circuit unit.

When the information feedback unit 32 is connected to the first circuit unit, the image-forming apparatus 200 may obtain the first parameter related to the process cartridge 100 based on the working element.

When the information feedback unit 32 is connected to the first circuit unit, whether the information feedback unit 32 meets expectation may affect the accuracy of the image-forming apparatus 200 to obtain the first parameter. When the information feedback unit 32 does not meet expectation, the image-forming apparatus 200 may obtain the first parameter inaccurately. When the information feedback unit 32 is connected to the second circuit unit, the feedback information may change, and the feedback information before and after the change may be configured to determine whether the information feedback unit 32 meets expectation.

The control unit 33 may control the state switching between the detection unit 31 and the information feedback unit 32, such that the information feedback unit 32 may be changed from being electrically connected to the first circuit unit, where the detection unit 31 is located, to being connected to the second circuit unit different from the first circuit unit. The voltage division at the information feedback unit 32 may be changed, that is, the feedback information may be changed. The resistance of the information feedback unit 32 may be measured through changing the voltage division, and it determines whether the resistance of the information feedback unit 32 meets expectation. If the resistance of the information feedback unit 32 meets expectation, it indicates that the first parameter related to the process cartridge 100 obtained based on the working element may be accurate. If the resistance of the information feedback unit 32 does not meet expectation, it indicates that the first parameter related to the process cartridge 100 obtained based on the working element may have deviation.

Optionally, corresponding description of the working element may refer to above-mentioned embodiments, which may not be described in detail herein.

Optionally, if the resistance of the information feedback unit 32 detected in the second state is not within expected resistance range, it determines that the resistance of the information feedback unit 32 may not meet expectation; and whether the first parameter or the second parameter obtained based on the first parameter meets expectation may be not determined. At this point, since the resistance value of the information feedback unit 32 is detected to be abnormal, it may affect the accuracy of the first parameter or the second parameter. Therefore, whether the first parameter or the second parameter meets expectation may be not determined to prevent mis-determination.

Optionally, the first parameter may be obtained by detecting total voltage division of the information feedback unit 32, the detection unit 31 and/or the working element. Obviously, in other embodiments, the working element may also transmit the first parameter to the image-forming apparatus 200 after obtaining the first parameter.

Optionally, the first circuit unit may be different from the second circuit unit, which may at least include the following scenarios: the first circuit unit and the second circuit unit may be two completely different circuits; or the circuits of the first circuit unit and the second circuit unit may be partially overlapped with each other.

Furthermore, when the circuits of the first circuit unit and the second circuit unit are partially overlapped with each other, the first circuit unit may be a series circuit, the second circuit unit may be a parallel circuit, and the first circuit unit may be one of the branches of the second circuit unit. Regardless of the first state or the second state, the first circuit unit may be connected to the information feedback unit 32; and in the first state, the branches of the second circuit unit other than the first circuit unit may be disconnected. Or the first circuit unit and the second circuit unit may have a common circuit. For example, the first circuit unit and the second circuit unit may be grounded through same contact or wire.

Optionally, in the first state, the detection unit 31 may be electrically connected to the information feedback unit 32; and in the second state, the detection unit 31 may be disconnected from the information feedback unit 32.

Or the detection unit 31 may be electrically connected to the information feedback unit 32 but the detection unit 31 may be short-circuited.

Or the port corresponding to one end of the detection unit 31 electrically connected to the information feedback unit 32 may be configured as a high impedance state. At this point, the voltage division of the information feedback unit 32 in the second state may change, and the resistance of the information feedback unit 32 may be measured by the voltage division change of the information feedback unit 32 when switching between the first state and the second state.

Optionally, the resistance of the information feedback unit 32 may be detected in the second state, and the resistance of the information feedback unit 32 may be configured to obtain the first parameter in the first state.

For example, if the resistance of the information feedback unit 32 detected in the second state is not within expected value range, it determines that the resistance of the information feedback unit 32 does not meet expectation, and also determines that the first parameter or the second parameter does not meet expectation.

Optionally, when the detection unit 31 is electrically disconnected from the information feedback unit 32 in the second state, the detection circuit may further include the first matching circuit, where one end of the first matching circuit may be configured to be electrically connected to the information feedback unit 32, and another end of the first matching circuit may be configured to be grounded. The control unit 33 may include the first switch may be connected between the information feedback unit 32 and the first matching circuit and between the information feedback unit 32 and the detection unit 31 and may be configured to be electrically connected to the information feedback unit 32 with the first matching circuit or the detection unit 31 through switching action. The first controller may be configured to control the first switch to perform corresponding switching action according to the switching information outputted by the image-forming apparatus 200.

Optionally, the detection circuit may further include the first matching circuit, where one end of the first matching circuit may be configured to be electrically connected to the information feedback unit 32, and another end of the first matching circuit may be configured to be grounded. When the detection unit 31 is disconnected from the information feedback unit 32 in the second state, the control unit 33 may include the first switch configured to connect the information feedback unit 32 with the first matching circuit or the detection unit 31. In the first state, the first switch may connect the information feedback unit 32 with the detection unit 31 and disconnect the information feedback unit 32 from the first matching circuit; and in the second state, the first switch may disconnect the information feedback unit 32 from the detection unit 31 and connect the information feedback unit 32 with the first matching circuit. Furthermore, the second circuit unit may include the first matching circuit. Obviously, it may be understood that a voltage dividing element, such as a resistor, may be configured on the first matching circuit; or no voltage dividing element may be configured, such that the information feedback unit 32 may be directly grounded in the second state. For example, the first switch may be a single-pole double-throw switch 33*a* or a similar element capable of realizing the on-off function of the switching circuit.

Optionally, when the detection unit 31 is short-circuited in the second state, the control unit 33 may further include the second switch 33*a*, where the second switch 33*a* may be connected in parallel with the detection unit 31, and configured to short-circuit the detection unit 31 when the second switch 33*a* is turned on for conduction and to be electrically connected to the detection unit 31 to the information feedback unit when the second switch 33*a* is turned off for disconnection; and include the second controller 33*b*, configured to control the second switch 33*a* to be turned on or off according to the switching information outputted by the image-forming apparatus 200. The second controller 33*b* may be an element that may receive information from the image-forming apparatus 200 and control other elements, such as MCU, SOC, PLC and the like.

Optionally, when the detection unit 31 is connected to the information feedback unit 32 but the detection unit 31 is short-circuited in the second state, the information feedback unit 32 may be directly grounded. Furthermore, the second circuit unit may include the circuit where the second switch 33*a* is located and the detection unit 31. The second switch 33*a* may be an electronic switch, a diode, a triode or the like that may be disconnected or connected.

Optionally, one end of the detection unit 31 away from the working element may be configured to be electrically connected to the matching circuit 34 and the information feedback unit 32, respectively.

Optionally, in the second state, when the port corresponding to one end of the detection unit 31 electrically connected to the information feedback unit 32 is configured as a high impedance state, the detection circuit may further include the second matching circuit, where one end of the second matching circuit may be configured to be electrically connected to the information feedback unit 32, and another end of the second matching circuit may be configured to be grounded.

The control unit 33 may include the third controller, where the third controller may be configured to be electrically connected to the information feedback unit 32, the second matching circuit and the detection unit 31 respectively; and the third controller may be configured to set the electrical connection end electrically connected with the detection unit 31 to a high impedance state according to the switching information outputted by the image-forming apparatus 200. Two ports of the third controller may be respectively configured to be electrically connected to the second matching circuit and the detection unit 31. In the second state, the port corresponding to the detection unit 31 on the third controller may be configured as a high impedance state, and the information feedback unit 32 may be directly grounded. Furthermore, the second circuit unit may also include the second matching circuit.

Optionally, the information feedback unit 32 may include the first voltage dividing module 32*a*, configured to be electrically connected to the detection unit 31, where the side of the first voltage dividing module 32*a* away from the detection unit 31 may be configured for the image-forming apparatus 200 to perform potential detection to obtain feedback information. The image-forming apparatus 200 may obtain the first parameter by detecting the potential value of one end of the first voltage dividing module 32*a* away from the detection unit 31.

Furthermore, the first voltage dividing module 32*a* may be a resistor.

Optionally, the detection unit 31 may include the working element configured to detect or obtain the first parameter related to the process cartridge 100; or the detection unit 31 may be configured to be electrically connected to the working element, the working element may be configured to detect or obtain the first parameter related to the process cartridge 100, and the working element may be configured to enable the image-forming apparatus 200 to obtain the first parameter through the detection unit 31.

Furthermore, when the working element is the working environment sensor 2, the working environment sensor 2 may include a temperature sensor.

For example, as shown in FIG. 11, the image-forming apparatus 200 may include a potential detection terminal 209, a power supply 210 and a second voltage dividing module 211. The power supply 210, the second voltage dividing module 211 and the first voltage dividing module 32*a* may be connected in series in sequence. The first voltage dividing module 32*a* may be electrically connected to the working environment sensor 2 and the second switch 33*a* respectively, such that the working environment sensor 2 may be connected in parallel with the second switch 33*a*. The working environment sensor 2 and the end of the second switch 33*a* away from the working environment sensor 2 may be configured for grounding. The potential detection terminal 209 may be configured to detect the potential between the second voltage dividing module 211 and the first voltage dividing module 32*a*. When the second switch 33*a* is disconnected, the second voltage dividing module 211, the first voltage dividing module 32*a* and the working environment sensor 2 may be connected in sequence. At this point, the potential detection terminal 209 may obtain overall voltage division of the first voltage division module 32*a* and the working environment sensor 2 and obtain the detection value of the working environment sensor 2 using the potential obtained by the potential detection terminal 209.

Exemplarily, the first voltage dividing module 32*a* may be a resistor R1, the second voltage dividing module 211 may be a resistor R2, the working environment sensor 2 may be a thermistor R3 for temperature measurement, the second switch 33*a* may be a triode Q1, and the power supply 210 may be the power supply voltage VCC of the circuit. The standard value of R1 may be set to 10Ω, the standard value of R2 may be set to 20Ω, the resistance of thermistor R3 at 30° C. may be set to 10Ω, and the voltage division of Q1 when being turned on may be ignored. When R1=10Ω and Q1 is turned off, the potential value obtained by the potential detection terminal 209 may be:

$$VCC^*(R1+R3)/(R1+R2+R3)=VCC^*(10+10)/(10+20+10)=0.5VCC.$$

Since the temperature detection is configured based on the standard value of R1 being 10Ω, for the image-forming apparatus 200, when the potential value of the potential detection terminal 209 is 0.5VCC, the detected temperature value may be determined to be 30° C.

If R1 has a problem and the actual value of R1 is not the standard value of 10Ω but 50Ω, at same temperature (30° C.), R3 may be still 10Ω and R2 may be 20Ω. At this point, the potential value obtained by the potential detection terminal 209 may be: V=VCC*(5+10)/(5+20+10)=3/7VCC, which may be not equal to 0.5VCC. Based on the determination logic originally set by the image-forming apparatus 200, the temperature value obtained by the image-forming apparatus 200 through R3 may be not 30° C. at this point, but actual temperature should be 30° C. That is, the temperature obtained by the image-forming apparatus 200 may be different from actual temperature, and an error may occur.

Therefore, by measuring the actual value of R1 after Q1 is turned on, it may understand whether the temperature obtained by the image-forming apparatus 200 is incorrect, which may prevent mis-determination.

Embodiments of the present disclosure further provide the information processing apparatus 3 configured to be installed on the process cartridge 100. The process cartridge 100 may be configured to be detachably installed on an image-forming apparatus 200 and may include a substrate and the detection circuit as described above. The detection circuit may be configured on the substrate.

Optionally, when the detection unit 31 is on the information processing apparatus 3 and the working element is on the process cartridge 100, the end of the detection unit 31 for being electrically connected to the working element may be a terminal on the information processing apparatus 3, or a plug or socket configured on the information processing apparatus 3.

Optionally, when the information feedback unit 32 is on the information processing apparatus 3, one end of the information feedback unit 32 for being electrically connected to the image-forming apparatus 200 may be a terminal on the information processing apparatus 3. Furthermore, the terminal of the information feedback unit 32 for being electrically connected to the image-forming apparatus 200 and the communication terminal on the information processing apparatus 3 may be separately configured or may share a same terminal.

Obviously, above-mentioned information processing apparatus 3 and the information processing apparatus 3 mentioned in previous embodiments may be same information processing apparatus 3 or different information processing apparatuses 3.

Embodiments of the present disclosure further provide the process cartridge 100 for being detachably installed on an image-forming apparatus 200. The process cartridge 100 may include the main body 1 and the information processing apparatus 3 as described above.

Optionally, the working element may also be configured on the main body 1 of the process cartridge 100, the detection unit 31 may be electrically connected to the working element, and the working element may be configured to detect or obtain the first parameter related to the process cartridge 100.

Embodiments of the present disclosure further provide the process cartridge 100 for being detachably installed on the image-forming apparatus 200. The process cartridge 100 may include the main body 1 and an information processing apparatus installation region for installing above-mentioned information processing apparatus 3; and the information processing apparatus installation region may be configured on the main body 1. When the information processing apparatus 3 is installed in the information processing apparatus installation region, the feedback information may be related to the first parameter in the first state; and the feedback information may be not related to the first parameter in the second state.

Embodiments of the present disclosure further provide the process cartridge 100 for being detachably installed on an image-forming apparatus 200. The process cartridge 100 may include the main body 1 and the detection circuit. The detection circuit may include the detection unit 31, the information feedback unit 32 and the control unit 33. The detection unit 31 and/or the control unit 33 and/or the information feedback unit 32 may be at least partially configured on the main body 1; and the detection unit 31 may be configured to output the first parameter related to the process cartridge 100.

The information feedback unit 32 may be configured to be electrically connected to the detection unit 31 and provide the image-forming apparatus 200 with feedback information according to the connection state with the detection unit 31. The connection state between the detection unit 31 and the information feedback unit 32 may include the first state and the second state.

The control unit 33 may be configured to control the connection state of the detection unit 31 and the information feedback unit 32 to switch between the first state and the second state according to switching information outputted by the image-forming apparatus 200.

In the first state, the feedback information may be related to the first parameter, and the image-forming apparatus 200 may obtain the first parameter based on the feedback information; and in the second state, the feedback information may be not related to the first parameter.

Similarly, in order to solve the problem that the circuit or element configured to detect environmental parameters fails, which may lead to deviations in the detection results and affect normal printing, the process cartridge may also be a process cartridge configured to be detachably installed on the image-forming apparatus 200. The process cartridge may include the main body and the detection circuit.

The detection circuit may include the detection unit 31, where one end of the detection unit 31 may be configured to be electrically connected to the working element, another end of the detection unit 31 may be configured to be electrically connected to the information feedback unit 32, and the detection unit 31 may be connected to the image-forming apparatus 200 through the information feedback unit 32; and further include the control unit 33, configured to receive information from the image-forming apparatus 200 and control connection state of the detection unit 31 and the information feedback unit 32 to be the first state and the second state.

In the first state, the information feedback unit 32 may be connected to the first circuit unit, the first circuit unit may include the detection unit 31, and the detection unit 31 may be electrically connected to the information feedback unit 32; in the second state, the information feedback unit 32 may be connected to the second circuit unit, where the first circuit unit may be different from the second circuit unit; and when the information feedback unit 32 is connected to the first circuit unit, the image-forming apparatus 200 may obtain the first parameter related to the process cartridge 100 based on the working element.

Optionally, in the first state, the detection unit 31 may be electrically connected to the information feedback unit 32, and in the second state, the detection unit 31 may be disconnected from the information feedback unit 32; or the detection unit 31 may be electrically connected to the information feedback unit 32 but the detection unit 31 may be short-circuited; or the port corresponding to one end of the detection unit 31 electrically connected to the information feedback unit 32 may be configured as a high impedance state. At this point, the voltage division of the information feedback unit 32 in the second state may change, and the resistance of the information feedback unit 32 may be measured by the voltage division change of the information feedback unit 32 when switching between the first state and the second state.

Optionally, the resistance of the information feedback unit 32 may be detected in the second state, and the resistance of the information feedback unit 32 may be configured to obtain the first parameter in the first state.

For example, if the detected resistance value of the information feedback unit 32 is not within expected value range, it determines that the resistance value of the information feedback unit 32 does not meet expectation, and also determines that the first parameter or the second parameter does not meet expectation.

Optionally, when the detection unit 31 is electrically disconnected from the information feedback unit 32 in the second state, the detection circuit may further include the first matching circuit, where one end of the first matching circuit may be configured to be electrically connected to the information feedback unit 32, and another end of the first matching circuit may be configured to be grounded. The control unit 33 may include the first switch may be connected between the information feedback unit 32 and the first matching circuit and between the information feedback unit 32 and the detection unit 31 and may be configured to be electrically connected to the information feedback unit 32 with the first matching circuit or the detection unit 31 through switching action. The first controller may be configured to control the first switch to perform corresponding switching action according to the switching information outputted by the image-forming apparatus 200.

Optionally, the detection circuit may further include the first matching circuit, where one end of the first matching circuit may be configured to be electrically connected to the information feedback unit 32, and another end of the first matching circuit may be configured to be grounded. When the detection unit 31 is disconnected from the information feedback unit 32 in the second state, the control unit 33 may include the first switch configured to connect the information feedback unit 32 with the first matching circuit or the detection unit 31. In the first state, the first switch may connect the information feedback unit 32 with the detection unit 31 and disconnect the information feedback unit 32 from the first matching circuit; and in the second state, the first switch may disconnect the information feedback unit 32 from the detection unit 31 and connect the information feedback unit 32 with the first matching circuit. Furthermore, the second circuit unit may include the first matching circuit. Obviously, it may be understood that a voltage dividing element, such as a resistor, may be configured on the first matching circuit; or no voltage dividing element may be configured, such that the information feedback unit 32 may be directly grounded in the second state. For example, the first switch may be a single-pole double-throw switch 33*a* or a similar element capable of realizing the on-off function of the switching circuit.

Optionally, when the detection unit 31 is short-circuited in the second state, the control unit 33 may further include the second switch 33*a* and the second controller 33*b*, where the second switch 33*a* may be connected in parallel with the detection unit 31, and configured to short-circuit the detection unit 31 when the second switch 33*a* is turned on for conduction and to be electrically connected to the detection unit 31 to the information feedback unit when the second switch 33*a* is turned off for disconnection; and include the second controller 33*b*, configured to control the second switch 33*a* to be turned on or off according to the switching information outputted by the image-forming apparatus 200. The second controller 33*b* may be an element that may receive information from the image-forming apparatus 200 and control other elements, such as MCU, SOC, PLC and the like.

Optionally, when the detection unit 31 is connected to the information feedback unit 32 but the detection unit 31 is short-circuited in the second state, the information feedback unit 32 may be directly grounded. Furthermore, the second circuit unit may include the circuit where the second switch 33*a* is located and the detection unit 31. The second switch 33*a* may be an electronic switch, a diode, a triode or the like that may be disconnected or connected.

Optionally, one end of the detection unit 31 away from the working element may be configured to be electrically connected to the matching circuit 34 and the information feedback unit 32, respectively.

Optionally, in the second state, when the port corresponding to one end of the detection unit 31 electrically connected to the information feedback unit 32 is configured as a high impedance state, the detection circuit may further include the second matching circuit, where one end of the second matching circuit may be configured to be electrically connected to the information feedback unit 32, and another end of the second matching circuit may be configured to be grounded.

The control unit 33 may include the third controller, where the third controller may be configured to be electrically connected to the information feedback unit 32, the second matching circuit and the detection unit 31 respectively; and the third controller may be configured to set the electrical connection end electrically connected with the detection unit 31 to a high impedance state according to the switching information outputted by the image-forming apparatus 200. Two ports of the third controller may be respectively configured to be electrically connected to the second matching circuit and the detection unit 31. In the second state, the port corresponding to the detection unit 31 on the third controller may be configured as a high impedance state, and the information feedback unit 32 may be directly grounded. Furthermore, the second circuit unit may also include the second matching circuit.

Optionally, the second controller 33*b* may be configured on the information processing apparatus 3.

Furthermore, the second matching circuit 34 may be configured on the main body 1.

Optionally, the second switch 33*a* may be configured at the outer side of the information processing apparatus 3.

Furthermore, the second switch 33*a* may be configured on the main body 1.

Optionally, the process cartridge 100 may further include the detection circuit and the information processing apparatus 3 configured on the main body 1. The information feedback unit 32 may include the first voltage dividing module 32*a* electrically connected to the detection unit 31. The side of the first voltage dividing module 32*a* away from the detection unit 31 may be configured for the image-forming apparatus 200 to perform potential detection to obtain feedback information; and the first voltage dividing module 32*a* may be configured on the main body 1 or the information processing apparatus 3.

Optionally, the first voltage dividing module 32*a* may be configured at the outer side of the information processing apparatus 3.

Furthermore, when the detection circuit includes the first voltage dividing module 32*a*, the first voltage dividing module 32*a* may be configured on the main body 1.

Optionally, the process cartridge 100 may also include the information processing apparatus 3 and the working element; and the working element may be configured on the main body 1 or the information processing apparatus 3.

Furthermore, the detection unit 31 may include the working element configured to obtain the first parameter related to the process cartridge 100; or the detection unit 31 may be configured to be electrically connected to the working element, and the working element may be configured to detect or obtain the first parameter related to the process cartridge 100 and enable the image-forming apparatus 200 to obtain the first parameter through the detection unit 31.

Furthermore, when the working element is the working environment sensor 2, the working environment sensor 2 may include a temperature sensor.

Furthermore, the temperature sensor may be a thermocouple or a thermistor.

Optionally, the detection unit 31 may be configured at the outer side of the information processing apparatus 3.

Furthermore, the detection unit 31 may be configured on the main body 1.

Furthermore, the working element may be configured to be electrically connected to the information feedback unit 32 and a zero potential reference point respectively. Above-mentioned "electrically connected to the zero potential reference point" may be grounded.

It should be understood that above-mentioned "grounded" may be grounded through the grounding contact on the information processing apparatus 3; or may be grounded through the sheet metal or data board of the image-forming apparatus 200.

Optionally, the detection unit 31 and/or the first voltage dividing module 32*a* may be configured on the main body 1.

Embodiments of the present disclosure further provide the process cartridge 100 for being detachably installed on an image-forming apparatus 200. The process cartridge 100 may include the main body 1 and the detection circuit installation region. The detection circuit installation region may be configured on the main body 1. The detection circuit installation region may be configured to install the detection circuit as described above, such that the detection unit 31 and/or the control unit 33 and/or the information feedback unit 32 may be at least partially configured on the main body 1. When the detection circuit is installed in the detection circuit installation region, in the first state, the feedback information may be related to the first parameter, and the image-forming apparatus 200 may obtain the first parameter based on the feedback information; and in the second state, the feedback information may be not related to the first parameter.

Embodiments of the present disclosure provide a detection method, applied to the image-forming apparatus 200. The detection method may include the following exemplary steps.

The connection state between the control detection unit 31 and the information feedback unit 32 may be controlled to be in the first state, feedback information may be obtained based on the first state, and the first parameter related to the process cartridge 100 may be obtained based on the feedback information;

the connection state between the control detection unit 31 and the information feedback unit 32 may be controlled to switch from the first state to the second state, and feedback information not related to the first parameter may be obtained again based on the second state; and based on the feedback information corresponding to the first state and the feedback information corresponding to the second state, it determines whether the information feedback unit meets expectation.

Optionally, controlling the connection state between the control detection unit 31 and the information feedback unit 32 to switch from the first state to the second state may further include the following exemplary steps.

The detection unit 31 and the information feedback unit 32 may be controlled to switch from electrical connection to disconnection; or the detection unit 31 and the information feedback unit 32 may be controlled to switch from electrical connection to the detection unit 31 being short-circuited; or the detection unit 31 and the information feedback unit 32 may be controlled to switch from electrical connection to that the port corresponding to the end of the detection unit 31 electrically connected to the information feedback unit 32 is configured to be in a high impedance state.

In addition, corresponding to above-mentioned embodiments (exemplary embodiments one to seven), embodiments of the present disclosure further provide a computer-readable storage medium, where the computer-readable storage medium may store a program. When the program is running, the device where the computer-readable storage medium is located may be controlled to execute some or all of steps in above-mentioned method embodiments (the methods mentioned in exemplary embodiments one to seven). In a specific implementation, the computer-readable storage medium may be a disk, an optical disk, a read-only memory (ROM), a random access memory (RAM) or the like.

Corresponding to above-mentioned embodiments, embodiments of the present disclosure further provide a computer program product including executable instructions. When the executable instructions are executed on a computer, the computer may execute some or all of steps in above-mentioned method embodiments.

Those skilled in the art may realize that various units and algorithm steps described in embodiments of the present disclosure may be implemented by a combination of electronic hardware, computer software and electronic hardware. Whether these functions are performed in hardware or software may depend on specific applications and design constraints of the technical solutions. Those skilled in the art may use different methods to implement described functions for each specific application, but such implementation should not be considered to be beyond the scope of the present disclosure.

Those skilled in the art may clearly understand that for the convenience and simplicity of description, specific working process of the system, the device and the unit mentioned above may refer to corresponding process in above-mentioned method embodiments, which may not be described in detail herein.

Above-mentioned may be only optional implementation manners of the present disclosure, but the protection scope of the present disclosure may be not limited thereto. Any changes or substitutions, which may be easily thought by those skilled in the art within the technical scope in the present disclosure, should be included in the protection scope of the present disclosure. Therefore, the protection scope of the present disclosure should be based on the protection scope of the claims.

What is claimed is:

1. A process cartridge, detachably installed on an image-forming apparatus, comprising:

a main body;

a working element, disposed on the main body and configured to detect or obtain a first parameter related to the process cartridge, wherein the image-forming apparatus is capable of obtaining the first parameter; and an information processing apparatus, disposed on the main body and configured to transmit a correction coefficient to the image-forming apparatus, wherein the correction coefficient is used to correct the first parameter to obtain a second parameter.

2. The process cartridge according to claim 1, wherein the information processing apparatus includes:

a storage module, configured to store the correction coefficient; or store associated information wherein the associated information is configured to calculate the correction coefficient; or store a preset algorithm wherein the preset algorithm is configured to calculate the correction coefficient.

3. The process cartridge according to claim 2, wherein:

when the storage module stores the associated information, the information processing apparatus further includes a first calculation module configured to calculate the correction coefficient based on the associated information; and when the storage module stores the preset algorithm, the information processing apparatus further includes a second calculation module configured to calculate the correction coefficient based on the preset algorithm.

4. The process cartridge according to claim 3, wherein:

the information processing apparatus includes a first unit and a second unit, wherein the first unit is electrically connected to the second unit; the storage module is configured at the first unit; the first calculation module or the second calculation module is configured at the second unit; and one of the first unit and the second unit is a chip, and another one of the first unit and the second unit is a chip or an external circuit.

5. The process cartridge according to claim 1, wherein:

the information processing apparatus is further configured to obtain the correction coefficient externally; or obtain associated information externally, wherein the associated information is configured to calculate the correction coefficient; or obtain a preset algorithm externally, wherein the preset algorithm is configured to calculate the correction coefficient.

6. The process cartridge according to claim 5, wherein:

when the information processing apparatus obtains the associated information externally, the information processing apparatus further includes a first calculation module configured to calculate the correction coefficient based on the associated information; and when the information processing apparatus obtains the preset algorithm externally, the information processing apparatus further includes a second calculation module configured to calculate the correction coefficient based on the preset algorithm.

7. The process cartridge according to claim 1, wherein:

the information processing apparatus includes a communication module configured to communicate with the image-forming apparatus, wherein the communication module and the working element are configured to be electrically connected to a same contact or different contacts on the image-forming apparatus.

8. The process cartridge according to claim 1, wherein:

the working element is a working environment sensor configured to detect a first parameter related to the process cartridge and enable the image-forming apparatus to obtain the first parameter; or the working element is a fixed resistor and configured to enable the image-forming apparatus to obtain the first parameter; or the working element is an adjustable resistor and configured to enable the image-forming apparatus to obtain the first parameter.

9. The process cartridge according to claim 8, wherein:

when the working element is the working environment sensor, the working environment sensor includes a temperature sensor.

10. The process cartridge according to claim 1, wherein:

the information processing apparatus includes a chip; the main body includes an image-forming assembly and a developing assembly; the image-forming assembly includes a photosensitive drum; the developing assembly includes a developing roller; and one of the chip and the working element is configured on the image-forming assembly, and another one of the chip and the working element is configured on the developing assembly; or the main body includes a developer accommodating cavity and an image-forming assembly; the developer accommodating cavity is configured to accommodate a developer; the image-forming assembly includes a photosensitive drum; and one of the chip and the working element is configured on the image-forming assembly, and another one of the chip and the working element is configured on the developer accommodating cavity; or the main body includes a developer accommodating cavity and a developing assembly; the developer accommodating cavity is configured to accommodate a developer; the developing assembly includes a developing roller; and one of the chip and the working element is configured on the developing assembly, and another one of the chip and the working element is configured on the developer accommodating cavity; or the main body includes a developer accommodating cavity, a developing assembly and an image-forming assembly; the developer accommodating cavity is configured to accommodate a developer; the image-forming assembly includes a photosensitive drum; the developing assembly includes a developing roller; one of the chip and the working element is configured on one of the developer accommodating cavity, the developing assembly and the image-forming assembly; and another one of the chip and the working element is configured on another one of the developer accommodating cavity, the developing assembly and the image-forming assembly; or the main body includes a developer accommodating cavity; the developer accommodating cavity is configured to accommodate a developer; and the chip and the working element are configured on the developer accommodating cavity; or the main body includes a developing assembly; the developing assembly includes a developing roller; and the chip and the working element are configured on the developing assembly; or the main body includes an image-forming assembly; the image-forming assembly includes a photosensitive drum; and the chip and the working element are configured on the image-forming assembly.

11. An information processing apparatus, configured at a main body of a process cartridge, wherein the process cartridge is detachably installed on an image-forming apparatus, comprising:

a communication module, configured to communicate with the image-forming apparatus; and a processing module, configured to output a correction coefficient to the image-forming apparatus through the communication module when a preset event occurs, wherein the correction coefficient is used to correct a first parameter obtained by the image-forming apparatus to obtain a second parameter.

12. The information processing apparatus according to claim 11, further including:

a storage module, configured to store the correction coefficient; or store associated information wherein the associated information is configured to calculate the correction coefficient; or store a preset algorithm wherein the preset algorithm is configured to calculate the correction coefficient.

13. The information processing apparatus according to claim 12, wherein:

when the storage module stores the associated information, the information processing apparatus further includes a first calculation module configured to calculate the correction coefficient based on the associated information; and when the storage module stores the preset algorithm, the information processing apparatus further includes a second calculation module configured to calculate the correction coefficient based on the preset algorithm.

14. The information processing apparatus according to claim 13, wherein:

the information processing apparatus includes a first unit and a second unit, wherein the first unit is electrically connected to the second unit; the storage module is configured at the first unit; the first calculation module or the second calculation module is configured at the second unit; and one of the first unit and the second unit is a chip, and another one of the first unit and the second unit is a chip or an external circuit.

15. The information processing apparatus according to claim 11, wherein:

the preset event includes that the communication module receives an obtaining request of the correction coefficient sent by the image-forming apparatus; or the preset event includes that an interaction between the information processing apparatus and the image-forming apparatus reaches a preset stage; or the preset event includes that the process cartridge enters a preset state.

16. The information processing apparatus according to claim 11, wherein:

when the preset event occurs, the processing module outputs the correction coefficient to the image-forming apparatus through the communication module at a preset frequency.

17. The information processing apparatus according to claim 11, wherein:

the information processing apparatus is further configured to obtain the correction coefficient externally; or obtain associated information externally, wherein the associated information is configured to calculate the correction coefficient; or obtain a preset algorithm externally, wherein the preset algorithm is configured to calculate the correction coefficient.

18. The information processing apparatus according to claim 17, wherein:

when the information processing apparatus obtains the associated information externally, the information processing apparatus further includes a first calculation module configured to calculate the correction coefficient based on the associated information; and when the information processing apparatus obtains the preset algorithm externally, the information processing apparatus further includes a second calculation module configured to calculate the correction coefficient based on the preset algorithm.

19. An adaptation assembly, configured at a process cartridge, comprising:

a working element, disposed on a main body of the process cartridge and configured to detect or obtain a first parameter related to the process cartridge, wherein the image-forming apparatus is capable of obtaining the first parameter; and the information processing apparatus according to claim 11.

20. The adaptation assembly according to claim 19, wherein:

the working element is a working environment sensor configured to detect the first parameter of the process cartridge and enable the image-forming apparatus to obtain the first parameter; or the working element is a fixed resistor and configured to enable the image-forming apparatus to obtain the first parameter; or the working element is an adjustable resistor and configured to enable the image-forming apparatus to obtain the first parameter.

* * * * *